United States Patent
Munoz et al.

(10) Patent No.: US 10,198,144 B2
(45) Date of Patent: Feb. 5, 2019

(54) MULTIDIMENSIONAL NAVIGATION

(71) Applicant: Google Inc., Mountain View, CA (US)

(72) Inventors: John Lee Munoz, San Jose, CA (US);
Kevin O'Malley, Palo Alto, CA (US);
Brett Aladdin Barros, Mountain View, CA (US)

(73) Assignee: Google LLC, Mountain View, CA (US)

( * ) Notice: Subject to any disclaimer, the term of this patent is extended or adjusted under 35 U.S.C. 154(b) by 218 days.

(21) Appl. No.: 14/839,833

(22) Filed: Aug. 28, 2015

(65) Prior Publication Data

US 2017/0060349 A1 Mar. 2, 2017

(51) Int. Cl.
*G06F 3/0481* (2013.01)
*G06F 3/0484* (2013.01)
*G06F 3/0482* (2013.01)

(52) U.S. Cl.
CPC .......... *G06F 3/0481* (2013.01); *G06F 3/0482* (2013.01); *G06F 3/04842* (2013.01)

(58) Field of Classification Search
None
See application file for complete search history.

(56) References Cited

U.S. PATENT DOCUMENTS

| | | | | |
|---|---|---|---|---|
| 6,028,600 A * | 2/2000 | Rosin | ................. | H04N 5/44543 348/38 |
| 6,104,401 A * | 8/2000 | Parsons | ............ | G06F 17/30899 707/E17.119 |
| 6,122,647 A * | 9/2000 | Horowitz | .......... | G06F 17/30873 707/999.003 |
| 6,154,757 A * | 11/2000 | Krause | .................. | G06F 3/0219 715/205 |
| 6,158,903 A * | 12/2000 | Schaeffer | ............... | G06Q 10/10 709/204 |
| 6,356,922 B1 * | 3/2002 | Schilit | ............... | G06F 17/30014 707/999.003 |

(Continued)

OTHER PUBLICATIONS

"Intab for Chrome," Mar. 2013, retrieved from <http://iansilber.com/intab/>.

(Continued)

*Primary Examiner* — Phenuel S Salomon
(74) *Attorney, Agent, or Firm* — Morgan, Lewis & Bockius LLP

(57) ABSTRACT

Systems and methods for multidimensional navigation are disclosed. An application presents an interface for displaying resources. The interface comprises a first control for navigating resources according to a first dimension and a second control for navigating resources according to a second dimension. The application presents a first resource. The application receives a user input for selecting a link to a second resource. The application determines whether to navigate to the second resource via the first dimension or via the second dimension. Upon determining to navigate to the second resource via the first dimension, the application provides for use of the first control to navigate back to the first resource. Upon determining to navigate to the second resource via the second dimension, the application provides for use of the second control to navigate back to the first resource.

19 Claims, 20 Drawing Sheets

(56) References Cited

U.S. PATENT DOCUMENTS

| | | | | |
|---|---|---|---|---|
| 6,658,623 B1* | 12/2003 | Schilit | G06F 17/30014 707/E17.013 |
| 9,619,108 B2* | 4/2017 | Dowd | G06F 3/0482 |
| 2002/0129226 A1* | 9/2002 | Eisen | G06F 9/3806 712/228 |
| 2003/0007002 A1* | 1/2003 | Hida | G06T 11/206 715/734 |
| 2004/0205514 A1* | 10/2004 | Sommerer | G06F 17/212 715/205 |
| 2004/0210830 A1* | 10/2004 | Cote | G06F 3/04892 715/205 |
| 2005/0086611 A1* | 4/2005 | Takabe | G06F 3/0482 715/823 |
| 2005/0091596 A1* | 4/2005 | Anthony | G06F 3/04815 715/712 |
| 2005/0229102 A1* | 10/2005 | Watson | G06F 3/0481 715/739 |
| 2006/0048076 A1* | 3/2006 | Vronay | G06F 3/0482 715/850 |
| 2006/0107229 A1* | 5/2006 | Matthews | G06F 3/0481 715/782 |
| 2006/0161861 A1* | 7/2006 | Holecek | G06F 17/30994 715/782 |
| 2006/0174211 A1* | 8/2006 | Hoellerer | G01C 21/20 715/782 |
| 2006/0209062 A1* | 9/2006 | Drucker | G06T 11/206 345/419 |
| 2007/0226645 A1* | 9/2007 | Kongqiao | G06F 3/0482 715/781 |
| 2007/0244919 A1* | 10/2007 | Wells | G06Q 10/10 |
| 2008/0244420 A1* | 10/2008 | Dube | G06F 17/30873 715/760 |
| 2010/0115428 A1* | 5/2010 | Shuping | G06F 17/30905 715/760 |
| 2011/0202847 A1* | 8/2011 | Dimitrov | G06F 3/0481 715/738 |
| 2014/0053070 A1* | 2/2014 | Powers | G06F 3/0484 715/708 |
| 2014/0108496 A1* | 4/2014 | Heller | G06F 17/30864 709/203 |
| 2017/0090699 A1* | 3/2017 | Pennington | G06F 3/0482 |

OTHER PUBLICATIONS

"Intab (Beta)," Apr. 11, 2013, retrieved from <https://chrome.google.com/webstore/detail/intab-beta/bfaekmalldododidalckpccilpcdefme?hl=en>.

* cited by examiner

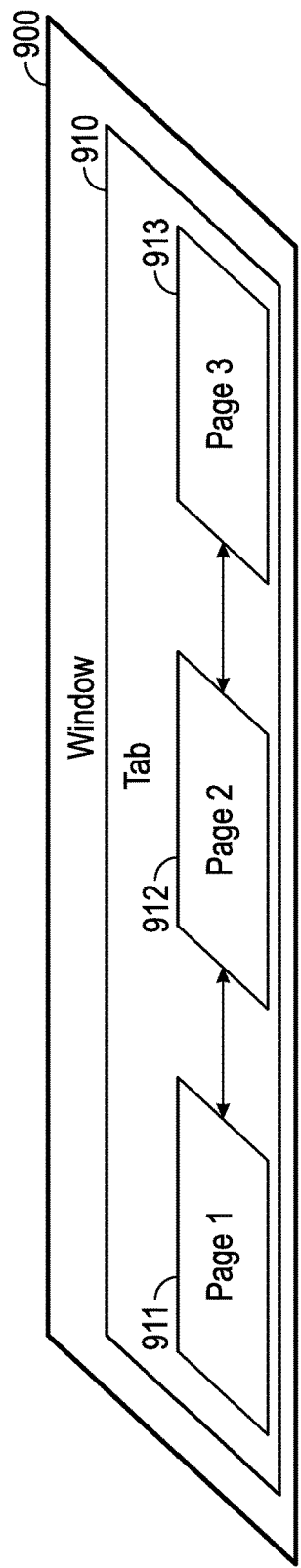
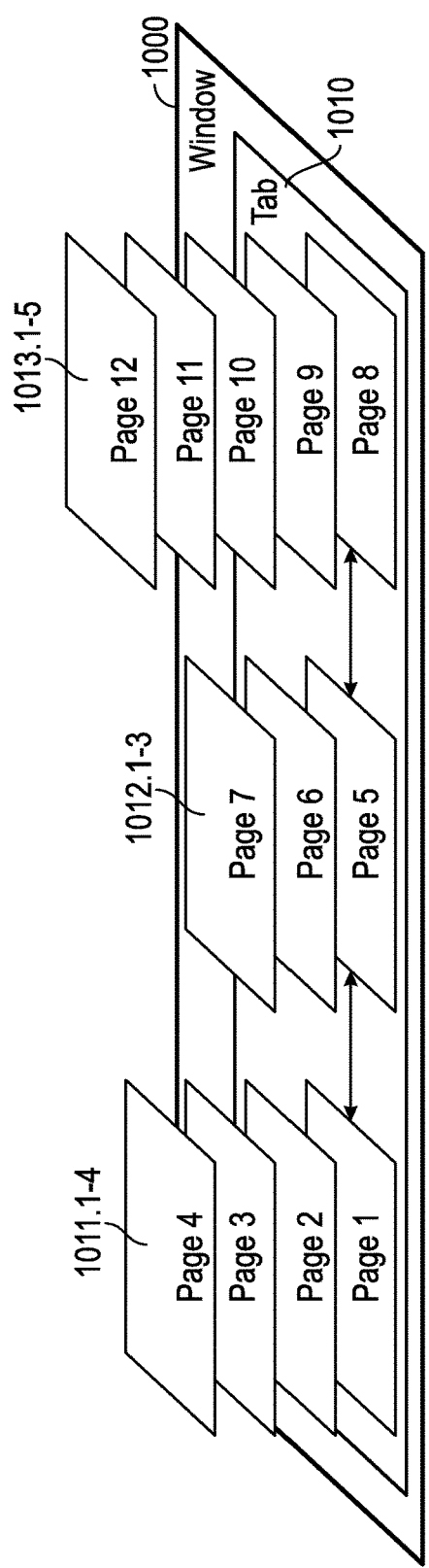
FIG. 9
FIG. 10

MULTIDIMENSIONAL NAVIGATION

BACKGROUND

The subject technology generally relates to navigation in an application such as a web browser, a document processing application, a social networking application, etc.

Current schemes for viewing and navigating resources, for example, pages or other content, may include linear progressions. For example, a user may enter the uniform resource indicator example.com into his/her browser, then select a link to view an article example.com/article1, and then select another link to view an article example.com/article2. The user may then use the back button on his/her browser to navigate back to example.com/article1, and then the forward button to return to example.com/article2. A browser may include multiple tabs, each of which has a different linear progression.

One drawback of the above scheme is that a user researching a topic in multiple tabs must rely on memory to remember why each tab was opened and what information it contains. This becomes exceedingly difficult as the number of pages, tabs or windows increases. As the foregoing illustrates, a new technique for page navigation may be desirable.

SUMMARY

According to some aspects, the subject technology relates to a computer-readable medium that stores instructions for implementing a method. The method includes presenting, within an application window, an interface for displaying resources, the interface comprising a first control for navigating resources according to a first dimension and a second control for navigating resources according to a second dimension, wherein each of the first dimension and the second dimension corresponds to an ordered list of two or more resources. The method includes presenting, within the application window, a first resource. The method includes receiving, from within the first resource, a user input for selecting a link to a second resource. The method includes determining, based on at least one of the user input or metadata of the link, whether to navigate to the second resource via the first dimension or via the second dimension. The method includes, upon determining to navigate to the second resource via the first dimension: providing for use of the first control to navigate, within the application window, from the second resource back to the first resource. The method includes, navigating to the second resource and upon determining to navigate to the second resource via the second dimension: navigating to the second resource and providing for use of the second control to navigate, within the application window, from the second resource back to the first resource.

According to some aspects, the subject technology relates to a method. The method includes presenting, within an application window, an interface for displaying resources, the interface comprising a first control for navigating resources according to a first dimension and a second control for navigating resources according to a second dimension, wherein each of the first dimension and the second dimension corresponds to an ordered list of two or more resources. The method includes presenting, within the application window, a first resource. The method includes receiving, from within the first resource, a user input for selecting a link to a second resource. The method includes determining, based on at least one of the user input or metadata of the link, whether to navigate to the second resource via the first dimension or via the second dimension. The method includes, upon determining to navigate to the second resource via the first dimension: navigating to the second resource and providing for use of the first control to navigate, within the application window, from the second resource back to the first resource. The method includes, upon determining to navigate to the second resource via the second dimension: navigating to the second resource and providing for use of the second control to navigate, within the application window, from the second resource back to the first resource.

According to some aspects, the subject technology relates to a system. The system includes one or more processors and a memory storing instructions. The instructions include code to present, within an application window, an interface for displaying resources, the interface comprising a first control for navigating resources according to a first dimension and a second control for navigating resources according to a second dimension, wherein each of the first dimension and the second dimension corresponds to an ordered list of two or more resources, and wherein at least one of the first control and the second control comprises a control for accessing a stacking interface. The instructions include code to present, within the application window, a first resource. The instructions include code to receive, from within the first resource, a user input for selecting a link to a second resource. The instructions include code to determine, based on at least one of the user input or metadata of the link, whether to navigate to the second resource via the first dimension or via the second dimension. The instructions include code to, upon determining to navigate to the second resource via the first dimension: navigate to the second resource and provide for use of the first control to navigate, within the application window, from the second resource back to the first resource. The instructions include code to, upon determining to navigate to the second resource via the second dimension: navigate to the second resource and provide for use of the second control to navigate, within the application window, from the second resource back to the first resource.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several aspects of the disclosed subject matter are set forth in the following figures.

FIG. 9 illustrates a second example conceptual view of linear page navigation.

FIG. 10 illustrates a second example conceptual view of multidimensional navigation.

DETAILED DESCRIPTION

Figure 1:
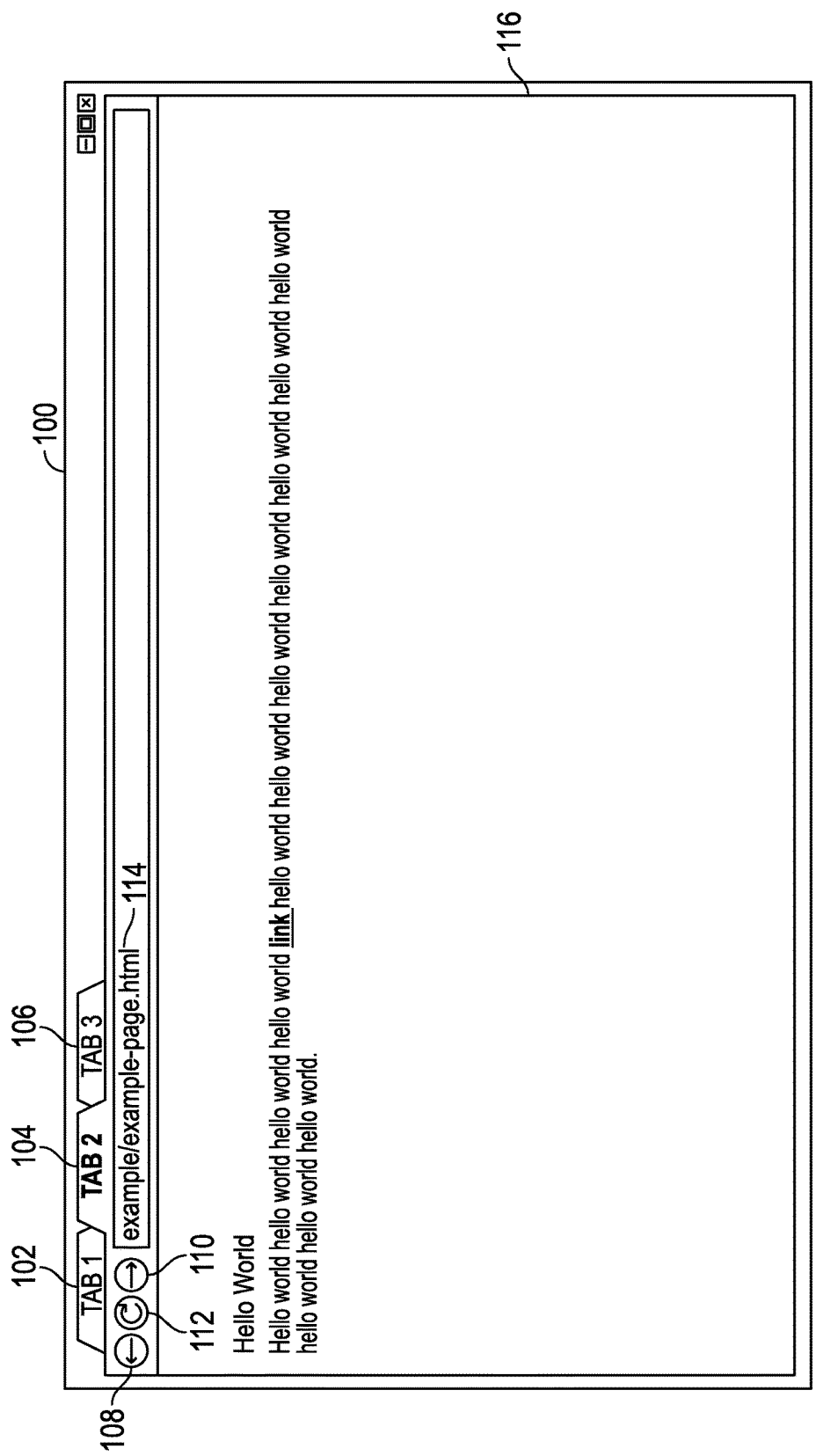
FIG. 1 illustrates an example tab of an application window.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details. In some instances, certain structures and components are shown in block diagram form in order to avoid obscuring the concepts of the subject technology.

The subject technology allows a user to navigate through multiple dimensions of resources, such as pages or other content, rather than a unidimensional linear sequence of resources, within a single tab of an application (or a window in an application that does not use tabs), such as a web browser, a document processing application, a gaming application, etc. According to some implementations, in addition to using the back and forward buttons to navigate through a linear sequence of pages, the user may associate a tab with a stack of pages through which the user may visually navigate. The uniform resource indicator (URI) address of each page in the stack may be stored in the master URI of the stack associated with the tab, allowing for sharing or bookmarking of the stack. The user may display different stacks of pages in different tabs or may navigate through various stacks of pages or single pages using the back and forward buttons in a single tab. As used herein, a URI may include a uniform resource locator (URL), a uniform resource name (URN) or an indicator of other resources or content, for example deep links of applications. In this context, the subject technology may be used to navigate web pages in a browser or to navigate resources or content of any other forms, such as deep links of applications, word processing documents in a word processing program, resources or content in a multidimensional gaming application, etc. Some examples of the subject technology are described herein in terms of pages. However, the subject technology may be used with any other resources or content in place of the pages, and is not limited to page navigation.

According to some implementations of the subject technology, an application window presents an interface for displaying pages. The interface includes a first control for navigating pages according to a first dimension and a second control for navigating pages according to a second dimension. The first dimension and the second dimension correspond to an ordered list of two or more pages. For example, the first control may include a back button and a forward button. The second control may include a control for accessing a stacking interface. For example, the second control may include two or more parallel bars (or any other user interface element, such as a button) which, when selected, cause a stack of pages to be presented. The stack may include pages that were previously presented in the application window.

The application window may present a first page. The application window may receive, from within the first page, a user input, such as a mouse click or a touchdown on a touch screen, for selecting a link to a second page. The application window, may determine, based on at least one of the user input or the metadata of the link, whether to navigate to the second page via the first dimension or via the second dimension. Navigating via the first dimension may include presenting the second page in the window and allowing the user to return to the first page by selecting the back button. Navigating via the second dimension may include adding the first page and the second page to a stack, and allowing the user to return to the first page by accessing the stack and selecting the first page from the stack. More specifically, upon determining to navigate to the second page via the first dimension (e.g., the dimension accessed through back and forward buttons), the application may provide for use of the first control (e.g., the back button) to navigate, within the application window, from the second page back to the first page. Alternatively, upon determining to navigate to the second page via the second dimension (e.g., the dimension accessed through the stack), the application may provide for use of the second control (e.g., the control for accessing the stack) to navigate, within the application window, from the second page back to the first page.

The application window may include multiple tabs, and the technique described above may be implemented in a single tab of the application window. Alternatively, the application window may not include tabs. A page may include a webpage accessible via the Internet or a page stored in local memory of the computing device implementing the subject technology, such as a page including a locally-stored photograph or word processing document.

Some examples of the subject technology are described herein in conjunction with a web browser application that displays web pages. However, the subject technology may be implemented with any type of application that displays any type of pages.

The subject technology may be useful in many different use cases. For example, in a web browser context, when reading an online encyclopedia, a user may start to read about the topic of the sun, then link to an article about stars, then link to an article about supernovae, and then link to an article about black holes. The user may get distracted by the background articles and may not read any of the articles fully. Using linear back/forward browsing, either in a single tab, a single window, multiple tabs or multiple windows, the user may get confused about his/her research path and how he/she came to be reading about black holes. Using multidimensional browsing, as described herein, the user may be able to more easily trace back his/her steps through the articles about black holes, supernovae, stars, and the sun, for example, by having all of these articles in a stacking interface.

In another use example in the web browser context, a succinct how-to article may use technical terms unfamiliar to a novice. Rather than relying on the reader to conduct his/her own research to define these terms in a number of different tabs and windows, the author may provide multidimensional (e.g., stacking) links to articles explaining the terms via multidimensional navigation. The user may quickly read the multidimensionally linked articles and come back to the original article. For example, the how-to article may include the text, "use a widget-o-matic to align the gears." If the reader clicks on the term "widget-o-matic," a page may slide up explaining the meaning of this term. From the page that slid up, additional multidimensional (e.g., stacking) links with further information about widget-o-matics may be provided for interested readers. For example, a link to an additional article about "how to build your own widget-o-matic" may be provided. This allows readers who are interested in widget-o-matics to further research the topic, while those who simply want instructions to complete their task not to be distracted. Furthermore, readers interested in widget-o-matics will have a quick path back to the original article when they are finished researching widget-o-matics.

In addition, multidimensional navigation may save user's time when clicking on links. For example, without multidimensional navigation, a user reading an article may: (1) right-click a link, (2) select "open in new tab," then (3) find, and (4) click on the new tab to view the content. When finished, (5) the new tab is closed, and (6) the tab containing the original article is found and (7) selected. In a multidimensional navigation environment, a user reading an article may simply (1) click on the link to view the content, and when finished (2) click on the navigation button, (3) scroll back to the original article, and (4) select it. In some cases, multidimensional navigation may include, in addition to the back and forward buttons, fast back and fast forward buttons, or up or down buttons to more quickly navigate to an important previously viewed page.

Some examples of multidimensional navigation are described herein in the context of a browser (e.g., web browser) navigating pages (e.g., web pages). However, multidimensional navigation is not limited to this context and may be applicable in any context. Specifically, any resources, not only pages, may be navigated via multidimensional navigation. For example, multidimensional navigation may be used to navigate deep links to non-page-based resources or content within an application or applications, to navigate documents in a document processing application, to navigate within a gaming application, etc. Resources or content navigated using multidimensional navigation may be addressed using URIs, URLs, URNs or any other addressing technique.

FIG. 1 illustrates an example tab 104 of an application window 100. A shown, the application window includes multiple tabs 102, 104, and 106, of which tab 104 is the active tab, and tabs 102 and 106 are inactive. The tab 104 includes a viewing area 116 that displays a page. For instance, if the application window 100 is a web browser window, the page displayed in the viewing area 116 may be a webpage. The tab 104 also includes and address bar 114. The address bar 114 includes the address of the page displayed in the viewing area 116. For instance, if the page is a webpage, the address bar 114 may include the URI address of the webpage. The tab 104 further includes a back button 108, a forward button 110, and a reload button 112. The back button 108 and the forward button 110 allow the user to navigate through a linear sequence of pages. The linear sequence may be arranged based on an order in which the pages in the linear sequence were presented in the tab 104. The reload button 110, when selected, causes the page displayed in the viewing area 116 to be reloaded (e.g., from a web server).

Figure 2:
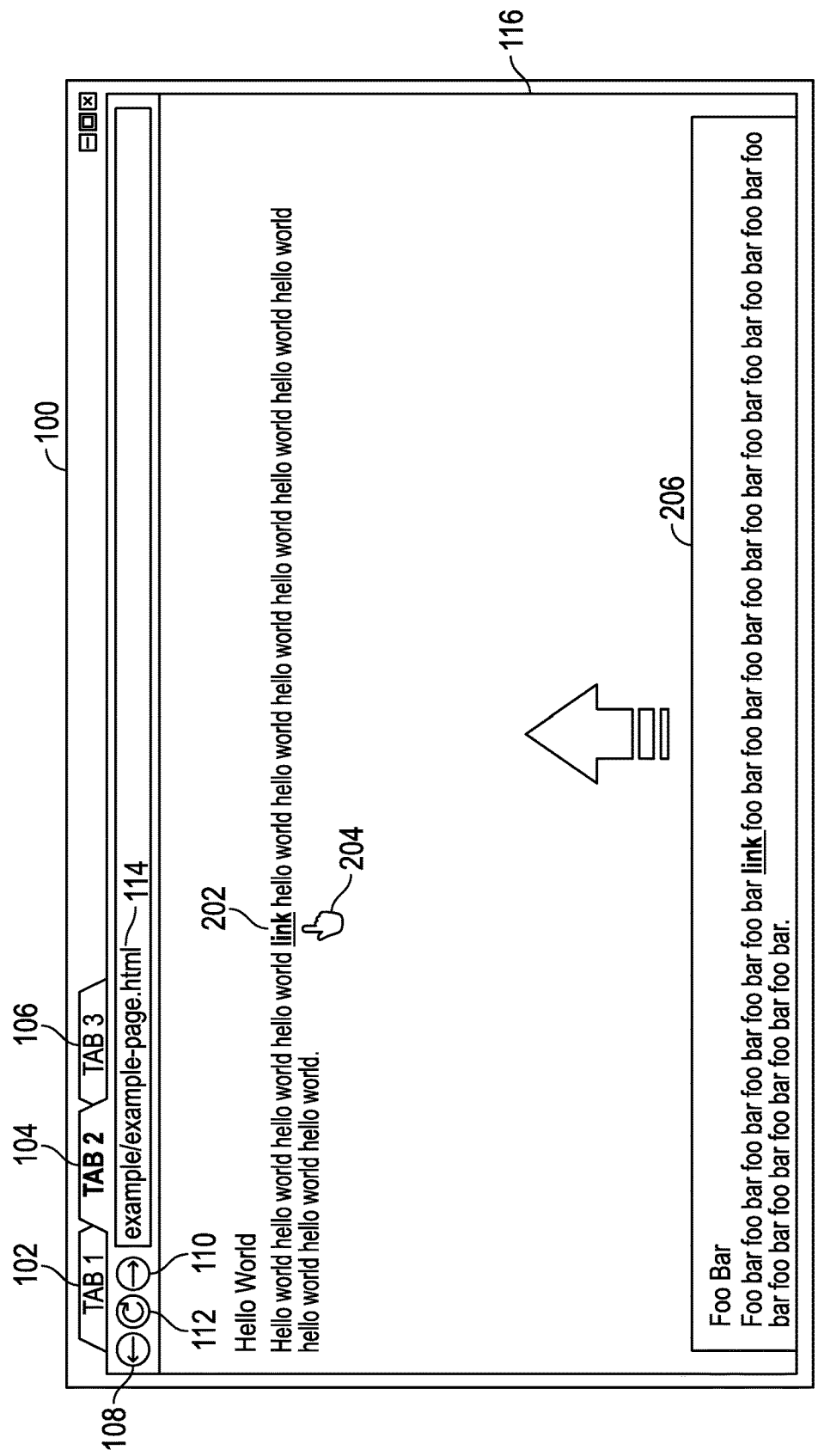
FIG. 2 illustrates an example of initiating multidimensional navigation.

FIG. 2 illustrates an example of initiating multidimensional navigation in the application window 100 with the active tab 104. As shown in FIG. 2, the user may hover a mouse (or a finger on a touchscreen) over a multidimensional link 202. Responsive to the hovering, the previously displayed page may continue to be displayed in the viewing area 116 of the tab 104. In addition, at least a portion of a page accessible through the link 202 may be presented within the content area 206, for instance, at the bottom of the tab as illustrated. The user may select the link 202, for example, by clicking the mouse over the link 202. In response to the user selecting the link 202, the interface described in conjunction with FIG. 3 or FIG. 4, below, may be presented.

A link 202 may be classified as a multidimensional link based on metadata of the link 202 provided by an author of the page, indicating that the link 202 should be treated as a multidimensional link. Alternatively, the link 202 may be classified as a multidimensional link based on options selected by a user of the application corresponding to the application window 100. In some examples, the user may left-click on the link 202 for the link 202 to be treated as a multidimensional link, or the user may right-click on the link 202 and select an option from a drop down menu for the link 202 to be treated as a non-multidimensional link. In some cases, a rule can be defined to determine whether an existing link should be treated as multidimensional or non-multidimensional. For example, a link to a page that is in the same origin as the page including the link (e.g., same protocol, hostname, and port number) may be treated as multidimensional and other links may be treated as non-multidimensional by default. Upon selection of a non-multidimensional link, the linked page may be presented in the viewing area 116, and the user may cause the previous page to be re-presented by selecting the back button 108. In a multidimensional navigation system, a first dimension of navigation may be navigated using the back button 108 and the forward button 110, and the second dimension may be navigated by stacking pages one on top of another, for example, as the page 206 is stacked on top of the currently displayed page that includes the link 202.

Figure 3:
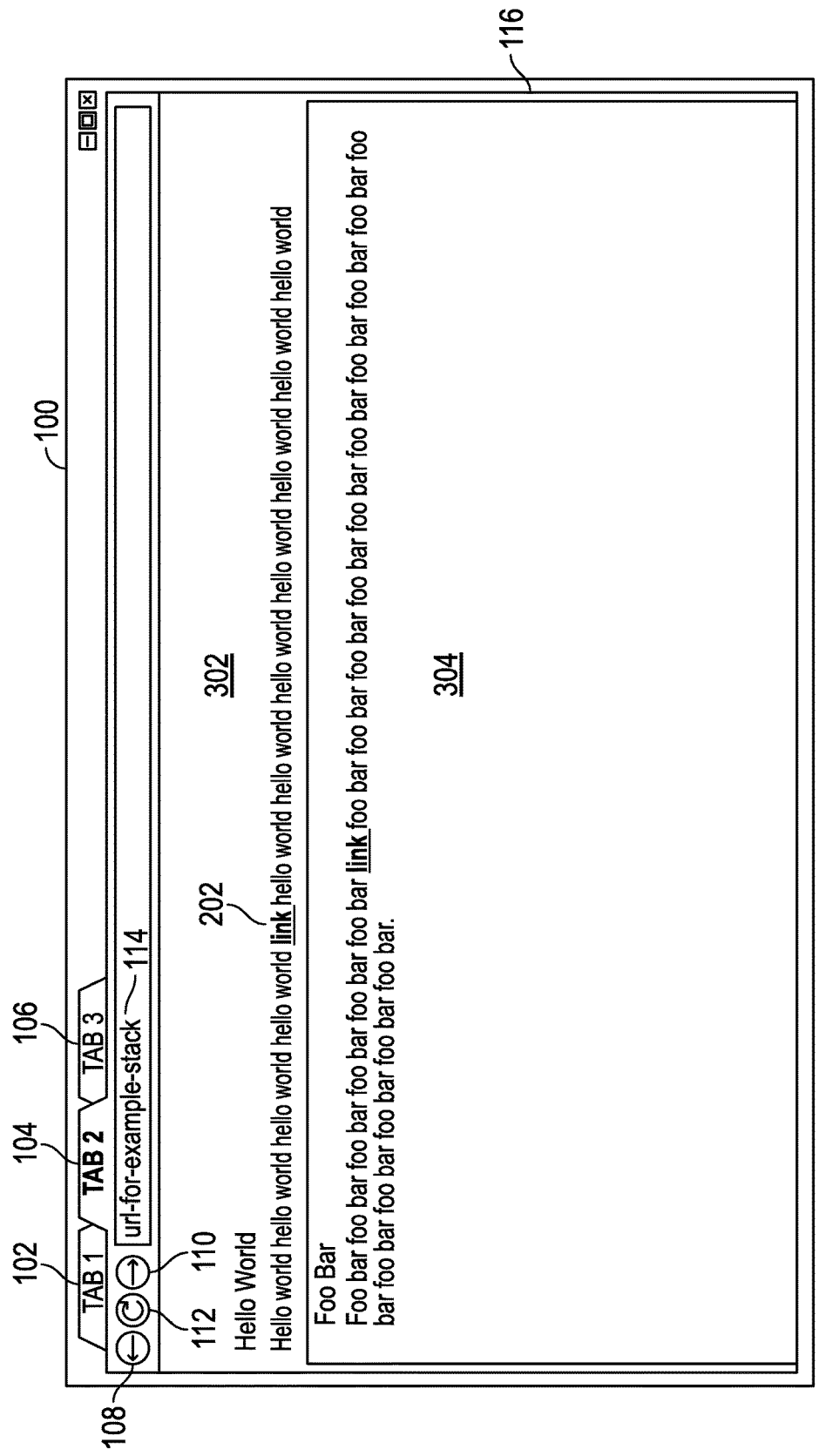
FIG. 3 illustrates an example of stacking one page on top of another.

FIG. 3 illustrates an example of stacking one page on top of another in the application window 100. The interface of FIG. 3 may be presented after the user selects the multidimensional link 202 of FIG. 2. Upon selection of the multi-dimensional links, a stack of pages 302 and 304 may be presented in the viewing area 116. The stack may include the previously presented page 302 and the newly presented page 304, which was accessed through the link. The newly presented page 304 may occupy a majority of the viewing area 116, with a small portion of the viewing area 116 allocated to the previously presented page 302, so that the user may easily select or navigate back to the previously presented page 302. The presented portion of the previously presented page 302 may include the multidimensional link 202 through which the user accessed the newly presented page 304, so that the user may easily remember how he/she came to be viewing the newly presented page 304.

As shown in FIG. 3, the stack may have its own address displayed in the address bar 114. In some examples, the address of the stack may include a combination of the addresses of the pages 302 and 304 in the stack. For example, if the pages 302 and 304 are webpages having URIs, the URI of the stack may include a combination of the URIs of the pages 302 and 304 in the stack. The user may save the address of the stack, for example, to a bookmark. The user may share the address of the stack, for example, via a messaging application. The application may share the URI of the stack via a messaging service in response to a user input.

One drawback of the implementation described in conjunction with FIG. 3 is that space in the viewing area 116 is occupied by the previously presented page 302 (and possibly other previously presented pages), preventing the user from using the full viewing area 116 to study the newly presented page 304.

Figure 4:
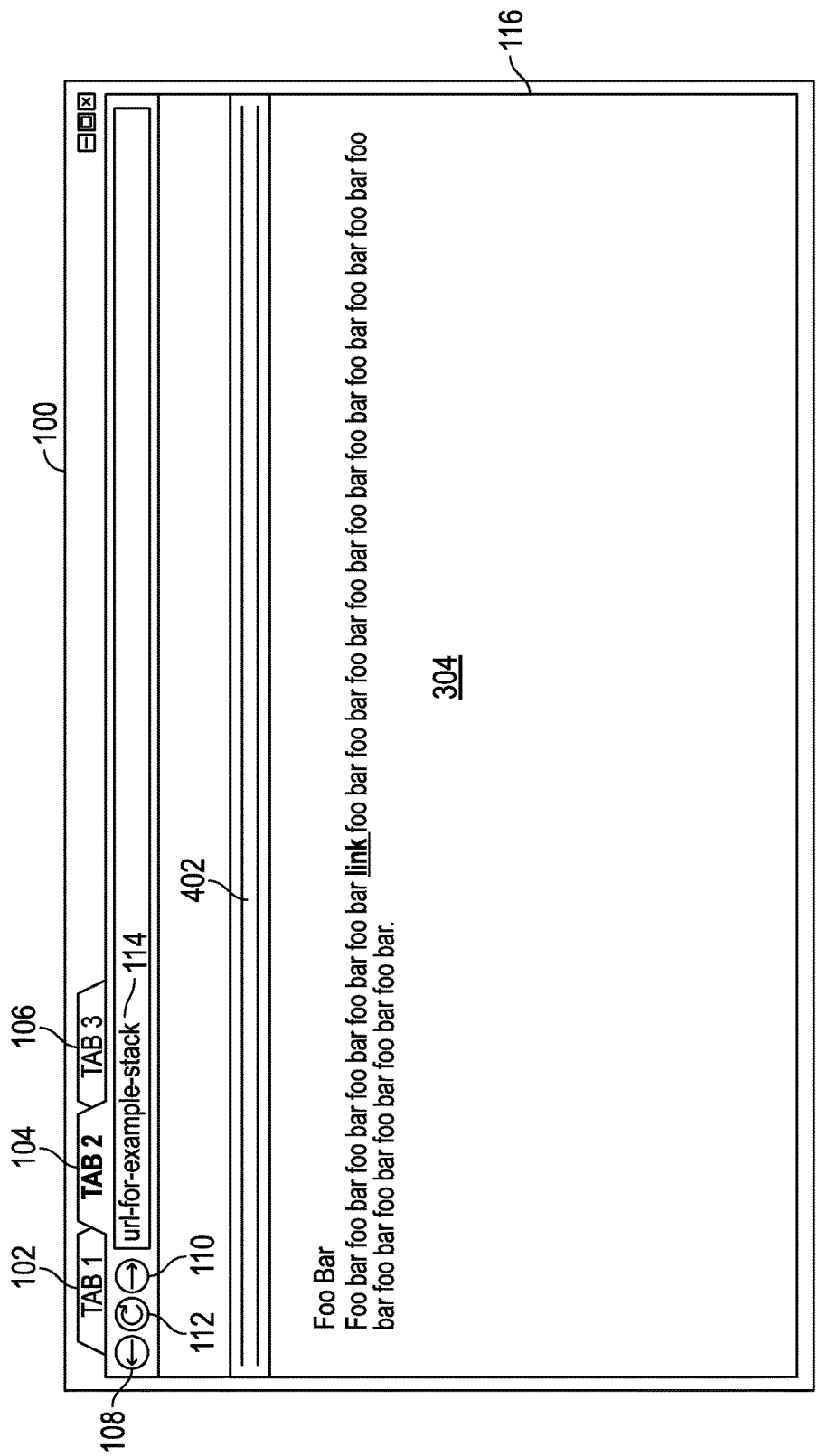
FIG. 4 illustrates an example of an interface for multidimensional navigation where a single page from a stack is displayed.

FIG. 4 illustrates an example of an interface for multidimensional navigation where a single page 304 from a stack is displayed in the viewing area 116 of the application window 100. The single page 304 may correspond to the newly presented page 304 of FIG. 3. The application window 100 also includes an indicator 402 indicating that other stacked pages are available. For example, the indicator 402 may include two stacked lines, as shown. Alternatively, the indicator 402 may be a button, a highlighted icon or any other indicator. The user may select the indicator 402 to cause the application window to provide an interface for accessing other pages in the stack. Examples of such an interface are discussed herein, for example, in conjunction with FIG. 3, above, or FIG. 5 or 6, below.

Figure 5:
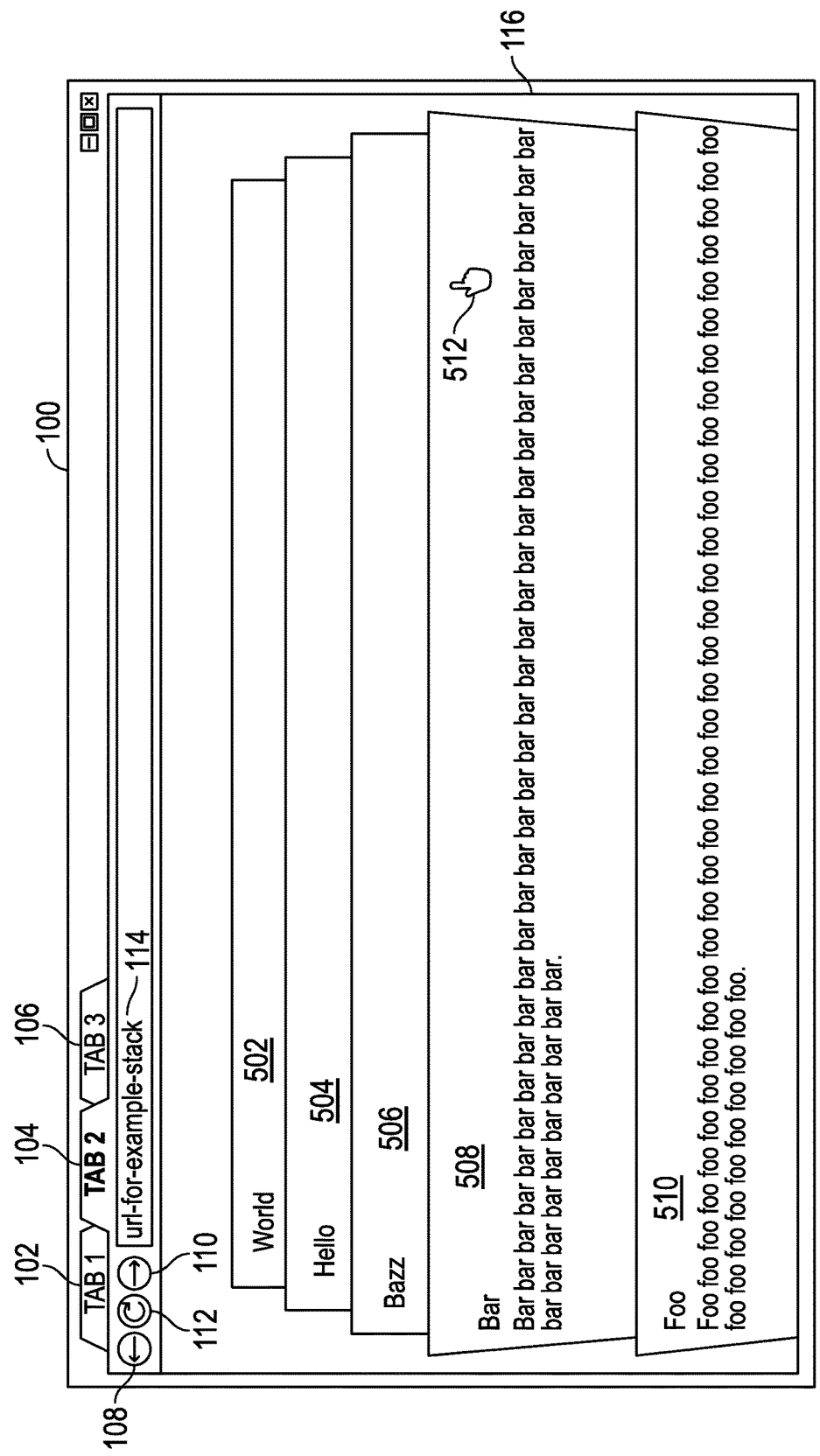
FIG. 5 illustrates an example of a three dimensional interface for multidimensional navigation where a user may select a page from a stack.

FIG. 5 illustrates an example of a three dimensional interface for multidimensional navigation where a user may select a page from a stack in the application window 100. For example, the three dimensional interface of FIG. 5 may be presented in response to the user's selection of the indicator 402 of FIG. 4. As shown in FIG. 5, cards 502, 504, 506, 508, and 510 representing pages in the stack are presented in the viewing area 116 of the active tab 104. Each card 502, 504, 506, 508, and 510 may include a portion of the represented page or an address of the represented page. The user may use a cursor 512 (or a finger or other touching device on a touchscreen) to scroll through or select a card from the stack. When the user hovers the cursor 512 over the card 508, as shown, the card 508 may become enlarged within the viewing area 116, while other cards 502, 504, 506, and 510 are still presented. When the user selects the card 508, using the cursor 512, the page associated with the card 508 may be displayed fully within the viewing area 116. For example, the interface of FIG. 4 may be used, with the page associated with card 508 being presented in the area marked by reference numeral 304. As shown in FIG. 5, when the cards 502, 504, 508, 508, and 510 of the stack are displayed, the address of the stack may be presented in the address bar 114. In FIG. 5, the first dimension may correspond to a dimension navigated via the back button 108 and the forward button 110. The second dimension may correspond to the pages represented by the cards 502, 504, 506, 508, and 510.

Figure 6:
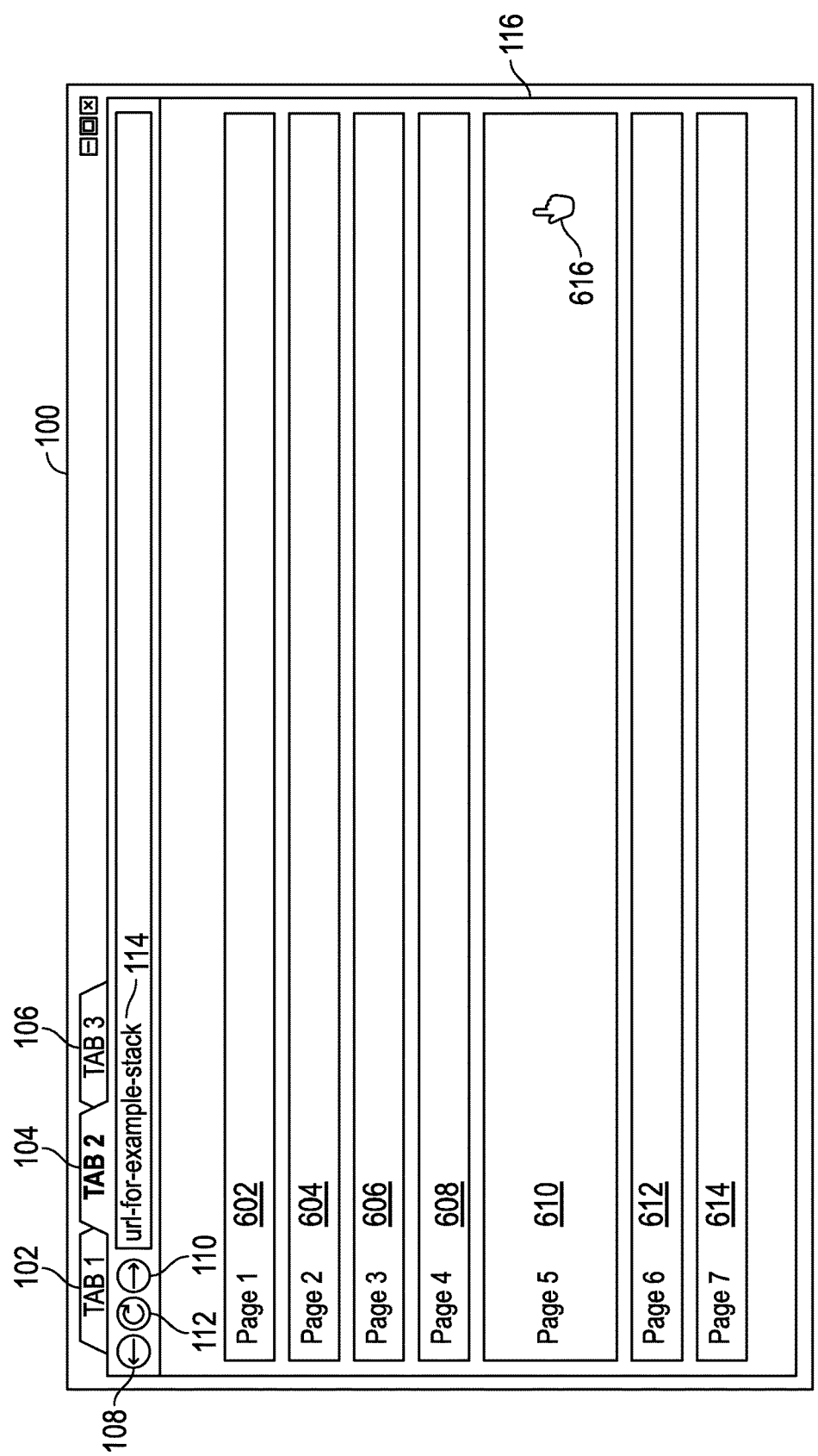
FIG. 6 illustrates an example of a two dimensional interface for multidimensional navigation where a user may select a page from a stack.

FIG. 6 illustrates an example of a two dimensional interface for multidimensional navigation where a user may select a page from a stack in the application window 100. For example, the two dimensional interface of FIG. 6 may be presented in response to the user's selection of the indicator 402 of FIG. 4. The interface of FIG. 6 may be an alternative interface to the interface of FIG. 5. As shown in FIG. 6, cards 602, 604, 606, 608, 610, 612, and 614 representing pages in the stack are presented in the viewing area 116 of the active tab 104. The user may use a cursor 616 (or a finger or other touching device on a touchscreen) hover over or select a card from the stack. When the user hovers the cursor 616 over the card 610, as shown, the card 610 may become enlarged within the viewing area 116, while other cards 602, 604, 606, 608, 612, and 614 are still presented. When the user selects the card 610, using the cursor 616, the page associated with the card 610 may be displayed fully within the viewing area 116. For example, the interface of FIG. 4 may be used, with the page associated with card 610 being presented in the area marked by reference numeral 304. As shown in FIG. 6, when the cards 602, 604, 606, 608, 610, 612, and 614 of the stack are displayed, the address of the stack may be presented in the address bar 114. In the example of FIG. 6, the first dimension may correspond to a dimension navigated via the back button 108 and the forward button 110. The second dimension may correspond to the pages represented by the cards 602, 604, 606, 608, 610, 612, and 614.

Figure 7:
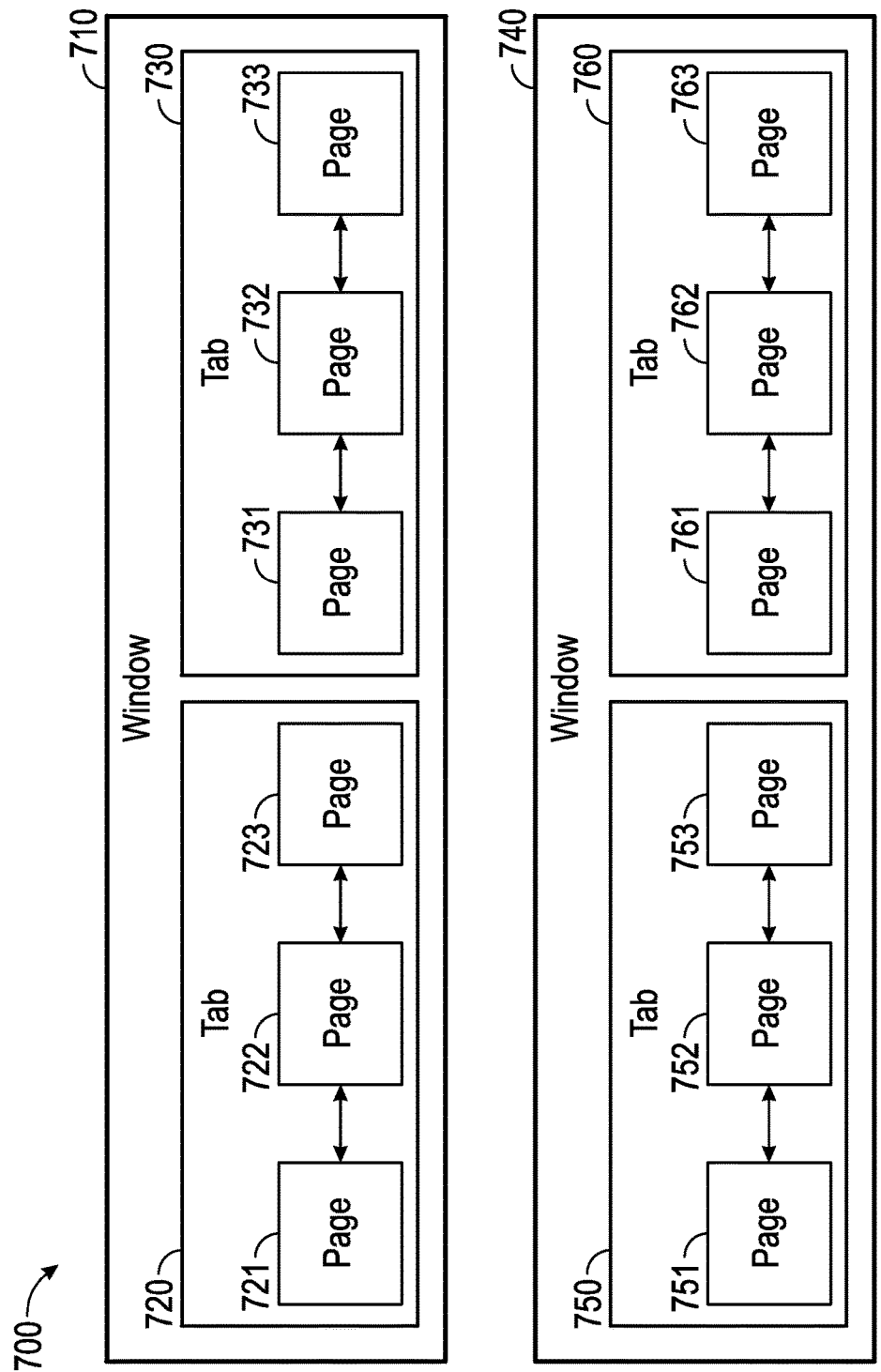
FIG. 7 illustrates a first example conceptual view of linear page navigation.

FIG. 7 illustrates a first example conceptual view 700 of linear page navigation. The conceptual view 700 illustrates two windows 710 and 740. The window 710 has two tabs 720 and 730. The tab 720 includes three pages 721, 722, and 723 arranged in a linear sequence that can be traversed using the back and forward buttons of an application window (e.g. the back button 108 and the forward button 110 of the application window 100 of FIG. 1). For instance, when page 722 is presented, the user may select the back button to cause the previous page 721 in the linear sequence to be presented or the user may select the forward button to cause the next page 723 in the linear sequence to be presented. When page 721 is presented, the user may select the forward button to cause the next page 722 in the sequence to be presented. When page 723 is presented, the user may select the back button to cause the previous page 722 in the sequence to be presented.

The tab 730 includes three pages 731, 732, and 733, and operates similarly to the tab 720. The window 740 has two tabs 750 and 760. The tab 750 includes three pages 751, 752, and 753 arranged in a linear sequence that operates similarly to the linear sequence of the tab 720. The tab 760 includes three pages 761, 762, and 763 arranged in a linear sequence that operates similarly to the linear sequence of the tab 720.

Figure 8:
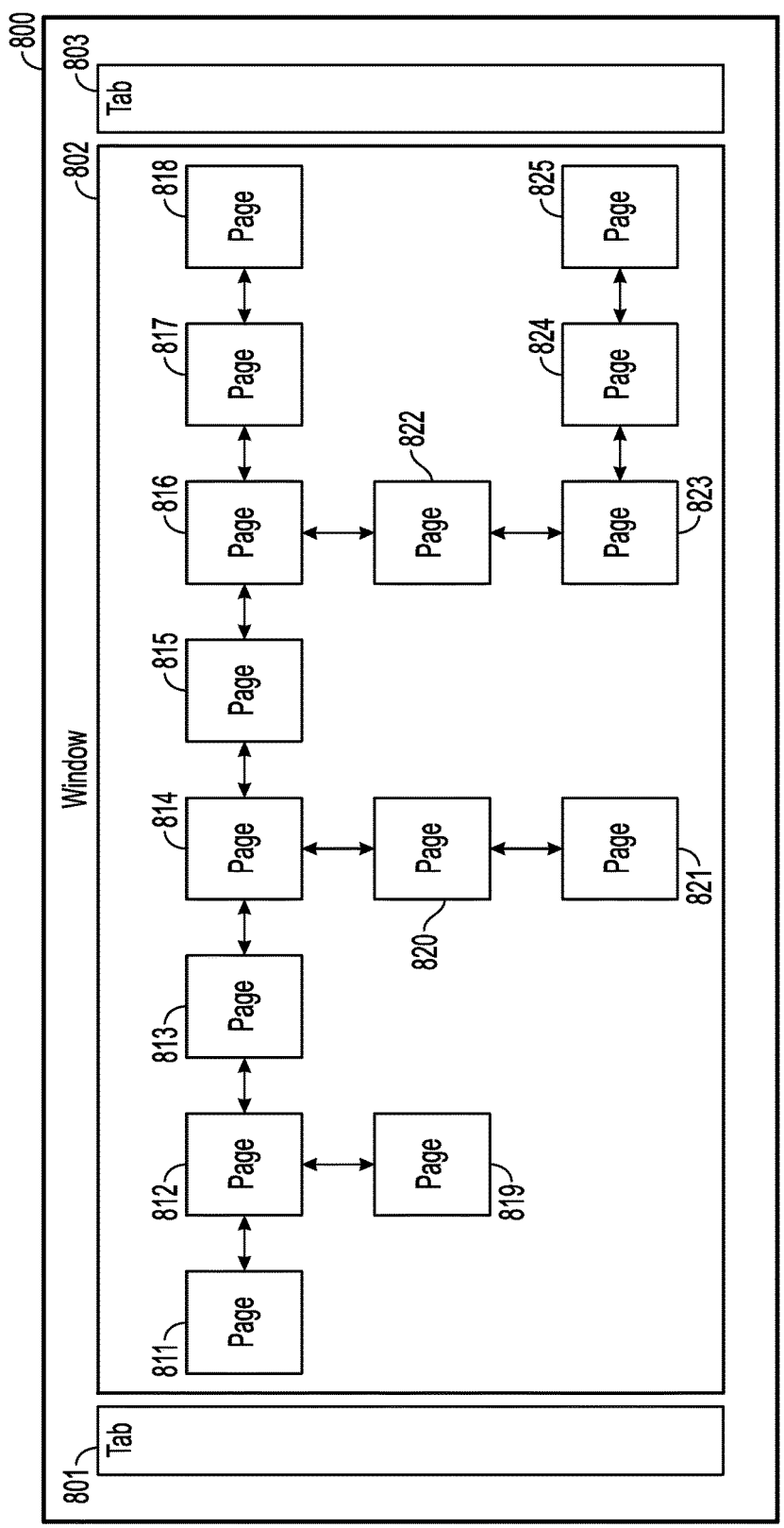
FIG. 8 illustrates a first example conceptual view of multidimensional navigation.

FIG. 8 illustrates a first example conceptual view of multidimensional navigation in a window 800. The window 800 may correspond to the application window 100. As shown, the window 800 includes three tabs 801, 802, and 803, which may correspond to the tabs 102, 104, and 106 of the application window 100 of FIG. 1. The tab 802 includes multiple pages 811-825 arranged in a multidimensional sequence. As shown the multidimensional sequence begins with a linear sequence of pages 811-818. The linear sequence of pages 811-818 may be traversed, for example, using the back and forward buttons and represents a first dimension. Pages 811, 813, 815, 817, and 818 are single pages not associated with a stack. However, page 812 is stacked with page 819 in a second dimension. For example, pages 812 and 819 may be associated with cards in a stack, as shown in FIGS. 5 and 6. Page 819 may have been opened via a multidimensional link (e.g., multidimensional link 202) from page 812. Similarly, page 814 is stacked with pages 820 and 821 in the second dimension and page 816 is stacked with pages 822 and 823 in the second dimension.

As also shown, page 823 is in a line with pages 824 and 825, representing a third dimension of navigation. According to some examples, the third dimension represents a "stack within a stack." For example, while viewing page 822, the user may have selected a multidimensional link that opened the stack of pages 823-824-825. According to other examples, the third dimension is traversed via the back and forward buttons, similar to the first dimension. In these example, if a user selects the forward button while viewing page 816, the application may navigate to page 817. However, if the user traverses the stack from page 816 to page 823, and then selects the forward button, the user application may navigate to page 824.

In summary, FIG. 8 represents three dimensions of navigation (first dimension 811-818, second dimension 812-819, 814-820-821, and 816-822-823, and third dimension 823-824-825). However, any number of dimensions of page navigation may be created using the subject technology via the "stack within a stack" technique, or via multiple uses of stacks and back/forward button navigation. For example, the subject technology may include four, five, six, seven, etc., dimensions of page navigation.

FIG. 9 illustrates a second example conceptual view of linear page navigation in a window 900. As shown, the window 900 includes a tab 910, which include three pages 911, 912, and 913 in a linear sequence. The linear sequence of pages 911, 912, and 913 may be navigated using the back and forward buttons. For instance, when page 912 is presented, the user may select the back button to cause the previous page 911 in the linear sequence to be presented or the user may select the forward button to cause the next page 913 in the linear sequence to be presented. When page 911 is presented, the user may select the forward button to cause the next page 912 in the sequence to be presented. When page 913 is presented, the user may select the back button to cause the previous page 912 in the sequence to be presented.

FIG. 10 illustrates a second example conceptual view of multidimensional navigation in a window 1000. As shown, the window 1000 includes a tab 1010, which includes multiple pages 1011.1-4, 1012.1-3, and 1013.1-5. The pages 1011.1, 1012.1, and 1013.1 are in a linear sequence representing a first dimension of navigation, which may be navigated, for example, using back and forward buttons. In addition, pages 1011.1-4 are stacked together representing a second dimension of navigation, which may be navigated via a stack interface as illustrated in FIGS. 5 and 6. Pages 1012.1-3 are similarly stacked together in a stack interface, which may be navigated via the stack interface. Pages 1013.1-5 are similarly stacked together in a stack interface, which may be navigated via the stack interface.

Figure 11:
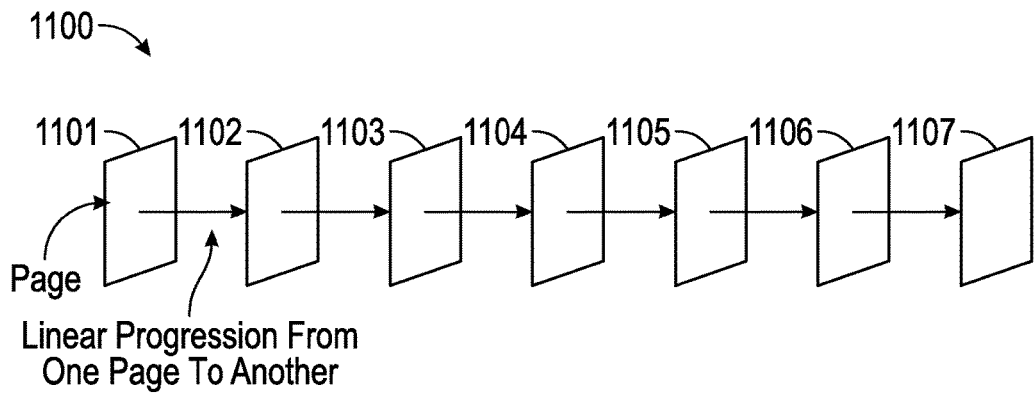
FIG. 11 illustrates an example linear progression of pages.

FIG. 11 illustrates an example linear progression 1100 of pages. The pages 1101-1107 are in the linear progression, and a user may navigate through the pages using the back button (e.g., back button 108 of FIG. 1) and the forward button (e.g., forward button 110 of FIG. 1). For example, when viewing page 1102, the user may use the back button to navigate to page 1101 or the forward button to navigate to page 1103. For any page n, where n is between 1102 and 1106, the user may use the forward button to view page n+1 and the back button to navigate to page n−1.

Figure 12:
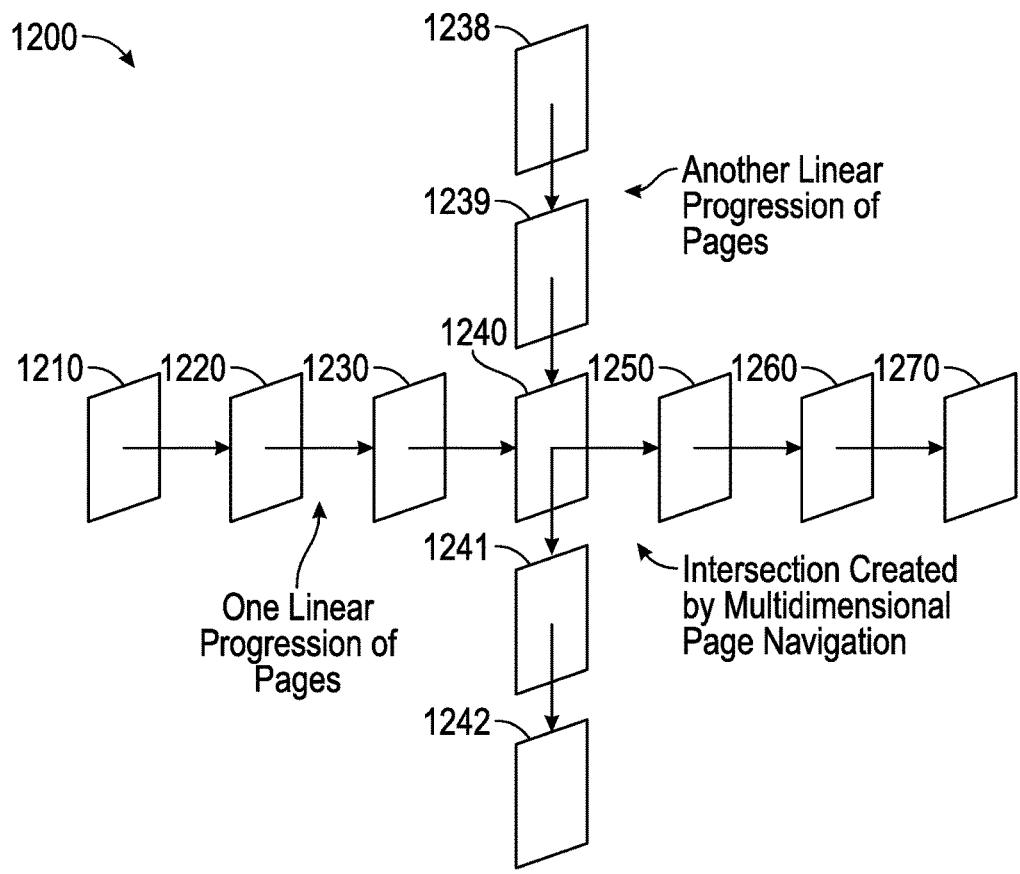
FIG. 12 illustrates a first example multidimensional progression of pages.

FIG. 12 illustrates a first example multidimensional progression 1200 of pages. As shown, the multidimensional progression includes two linear progressions of pages—pages 1210-1270 (incremented by 10) and pages 1238-1242 (incremented by 1). As shown, the two linear progressions 1210-1270 and 1238-1242 intersect at page 1240, from where a user may switch from navigating via one linear progression to navigating via another linear progression. The two linear progressions 1210-1270 and 1238-1242 may represent two stacks of pages. Alternatively, one of the linear progressions may be traversed by the back button and the forward button, and another one of the linear progressions may be represented by a stack. To switch from one linear progression to another, while viewing page 1240, the user may select the stack in which he/she wishes to navigate or the user may select to navigate via the stack or via the back and forward buttons.

Figure 13:
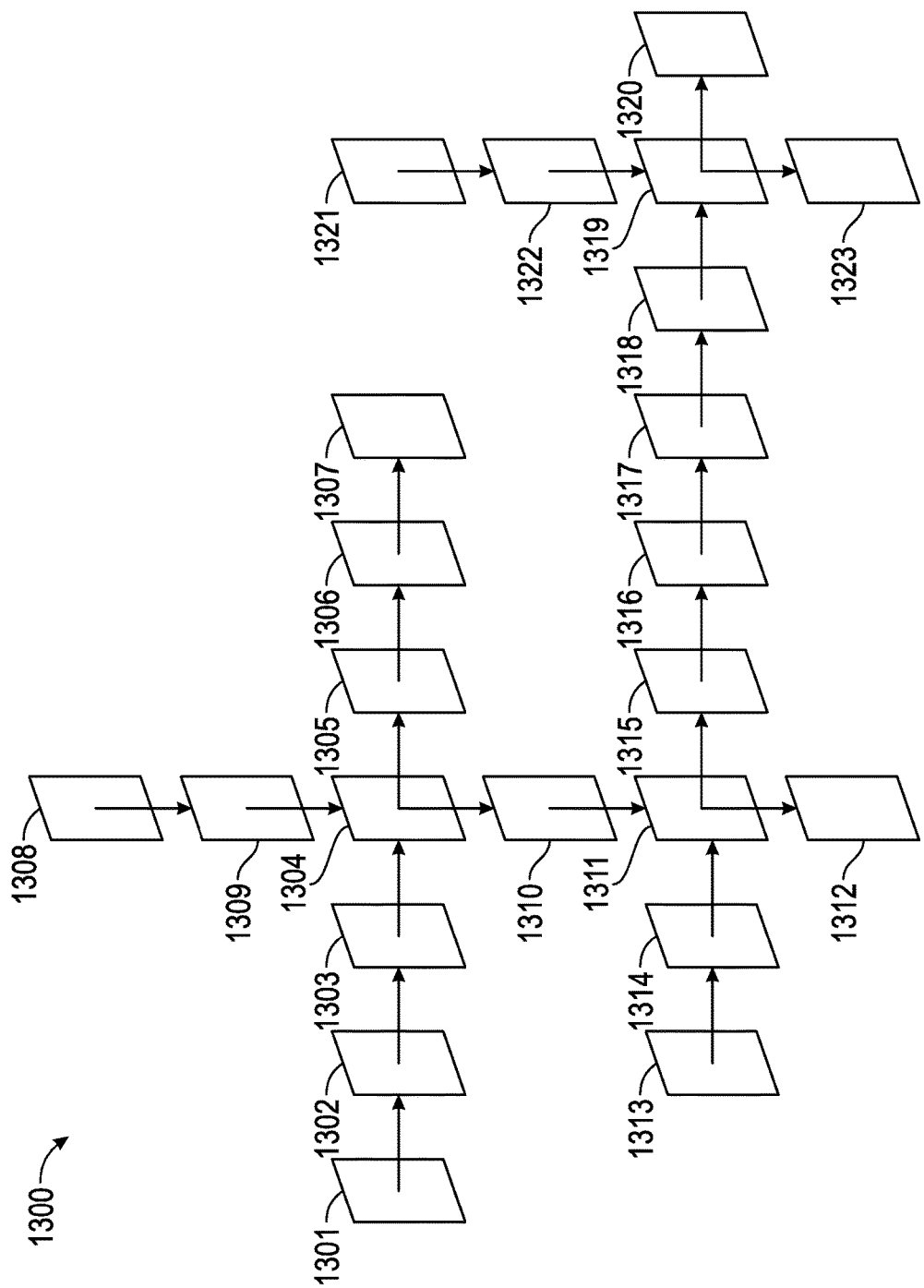
FIG. 13 illustrates a second example multidimensional progression of pages.

FIG. 13 illustrates a second example multidimensional progression 1300 of pages. As shown, the multidimensional progression 1300 includes pages 1301-1323 arranged in four different linear progressions of pages. According to some examples, the horizontal progressions 1301-1302-1303-1304-1305-1306-1307 and 1313-1314-1311-1315-1316-1317-1318-1319-1320 may correspond to linear progressions navigated via the back button and the forward button, and the vertical progressions 1308-1309-1304-1310-1311-1312 and 1321-1322-1319-1323 may correspond to progressions navigated via a stack. When viewing pages 1304, 1311 or 1319 located at intersections of progressions, the user may select through which progression he/she wishes to navigate, for example, by accessing either the interface for back/forward button navigation or the interface for stack navigation. As illustrated in FIG. 13, multiple intersections are possible in the subject technology, for example, by modifying the back and forward buttons to operate differently based on different positions in a stack of pages. For example, while viewing page 1304, the user may select the back button to navigate to page 1303 or the forward button to navigate to page 1305. Alternatively, the user may navigate through the stack to page 1311. Upon arriving at page 1311, the user may select the back button to navigate to page 1314 or the forward button to navigate to page 1315. Alternatively, both the horizontal and the vertical progressions may represent intersecting stacks that intersect at the pages 1304, 1311, and 1319.

Figure 14A:
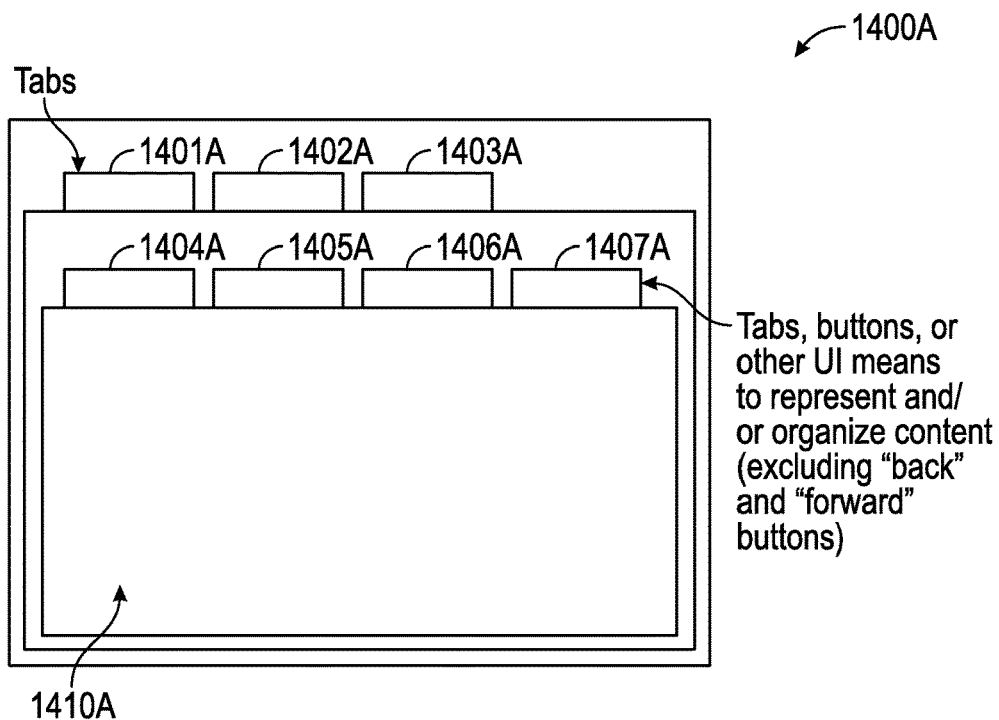
FIG. 14A illustrates an example application window with multiple tabs.

FIG. 14A illustrates an example application window 1400A with multiple tabs. The application window 1400A may be used with multidimensional navigation or with linear page navigation. In some examples, the application window 1400A illustrates how content can be organized with linear page navigation. As shown, the application window 1400A includes tabs 1401A, 1402A, 1403A, 1404A, 1405A, 1406A, and 1407A. Each of the tabs 1401A-1407A may be used to implement multidimensional navigation independently of the other tabs. The application window 1400A also includes a viewing area 1410A, where a page associated with one of the tabs 1401A-1407A, the active tab, may be presented.

Figure 14B:
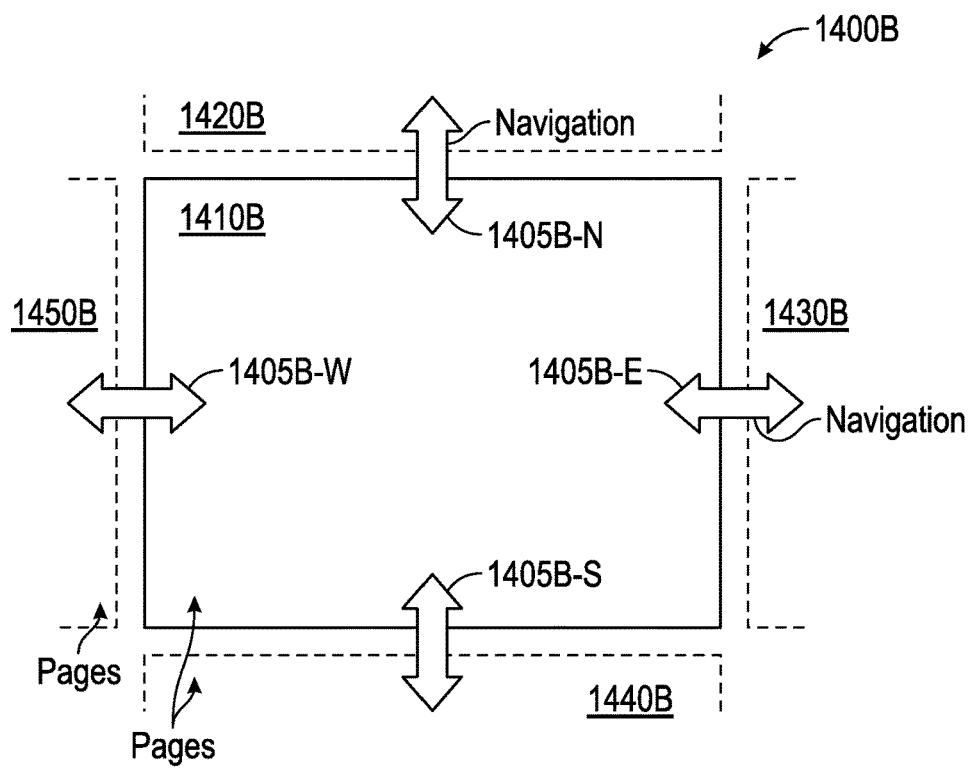
FIG. 14B illustrates an example interface for multidimensional navigation.

FIG. 14B illustrates an additional example interface 1400B for multidimensional navigation. The interface 1400B may exist in a tab of a window, in an instance of a window that does not have tabs or in a display of a non-window-based application. As shown in FIG. 14B, a page 1410B is displayed, along with a northward navigation control 1405B-N, an eastward navigation control 1405B-E, a southward navigation control 1405B-S, and a westward navigation control 1405B-W. The controls 1405B allow for navigating through pages previously accessed in the interface 1400B in multiple different dimensions (north-south and east-west).

For example, when the northward navigation control 1405B-N is selected from the page 1410, the page 1420B may be presented, and the user later may return to the page 1410B using the southward navigation control 1405B-S. When the southward navigation control 1405B-S is selected from the page 1410, the page 1440B may be presented, and the user later may return to the page 1410B using the northward navigation control 1405B-N. When the eastward navigation control 14059-E is selected from the page 1410, the page 1430B may be presented, and the user later may return to the page 1410B using the westward navigation control 1405B-W. When the westward navigation control 1405B-W is selected from the page 1410, the page 1450B may be presented, and the user later may return to the page 1410B using the eastward navigation control 1405B-E. It should be noted that the direction names—north, south, east, and west—are used as examples only and may be replaced with any other names or representations of directions (e.g., up, down, right, and left).

Figure 15:
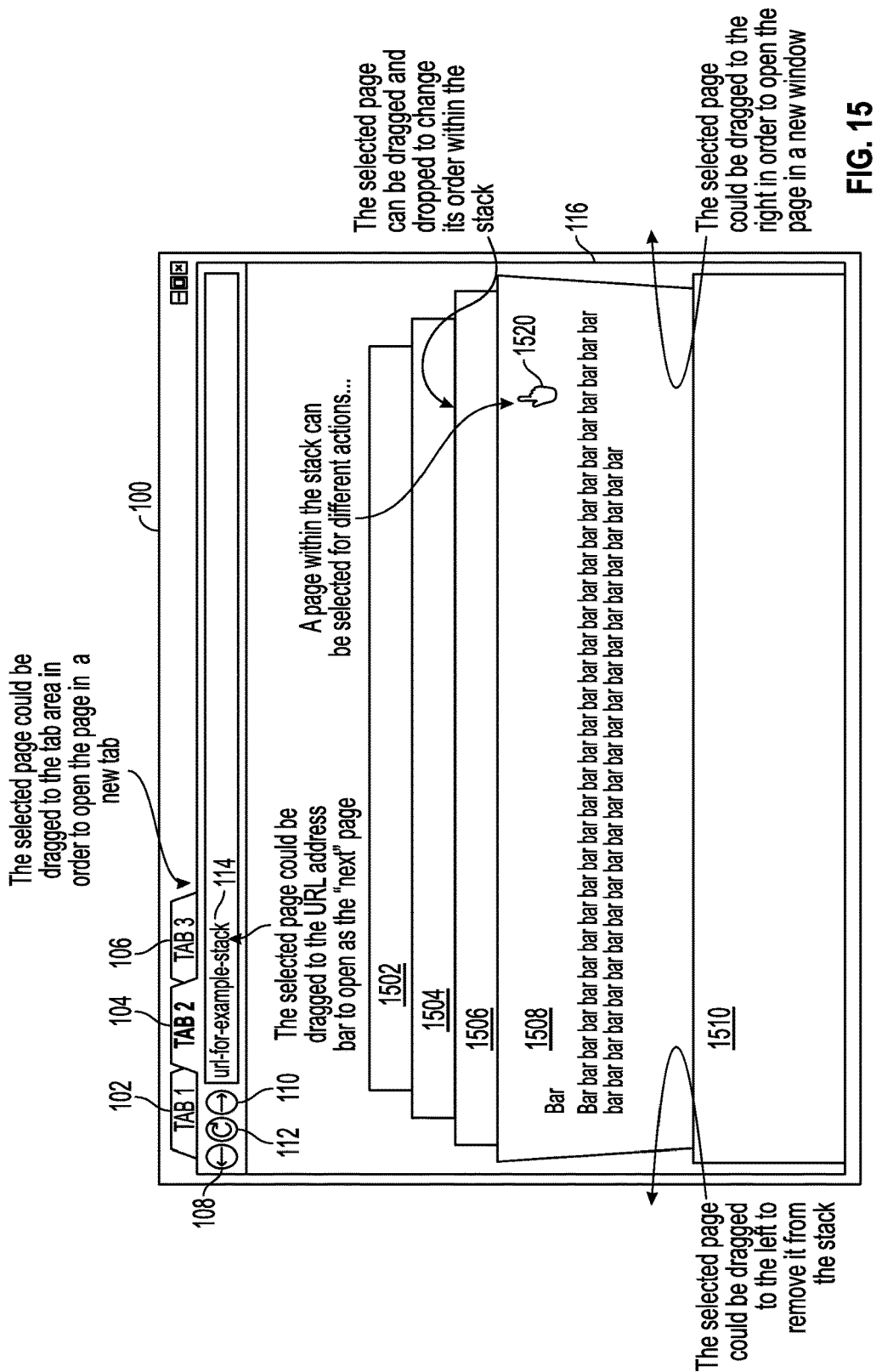
FIG. 15 illustrates an example page being selected from a stack.

FIG. 15 illustrates an example page being selected from a stack in the application window 100. As shown, the display area 116 of the application window 100 is displaying cards 1502, 1504, 1506, 1508, and 1510, representing pages in a stack. The user used the cursor 1520 to select the card 1508. After selecting the card 1508, the user may use the cursor 1520 to indicate an action to be taken with the page associated with the card 1508. For example, the use may drag the card to the address bar 114 to cause the page associated with the card 1508 to be opened as the next page in the back/forward button linear progression. The user may drag the card 1508 to the top of the application window 100, adjacent to the indicators of the tabs 102, 104, and 106, to cause the page associated with the card 1508 to open in a new tab. The user may drag the card 1508 to the left to remove the page associated with the card 1508 from the stack. The user may drag and drop the card 1508 across the stack to change the position of the card 1508 in the stack. The user may drag the card 1508 to the right to open the page associated with the card 1508 in a new window.

Figure 16:
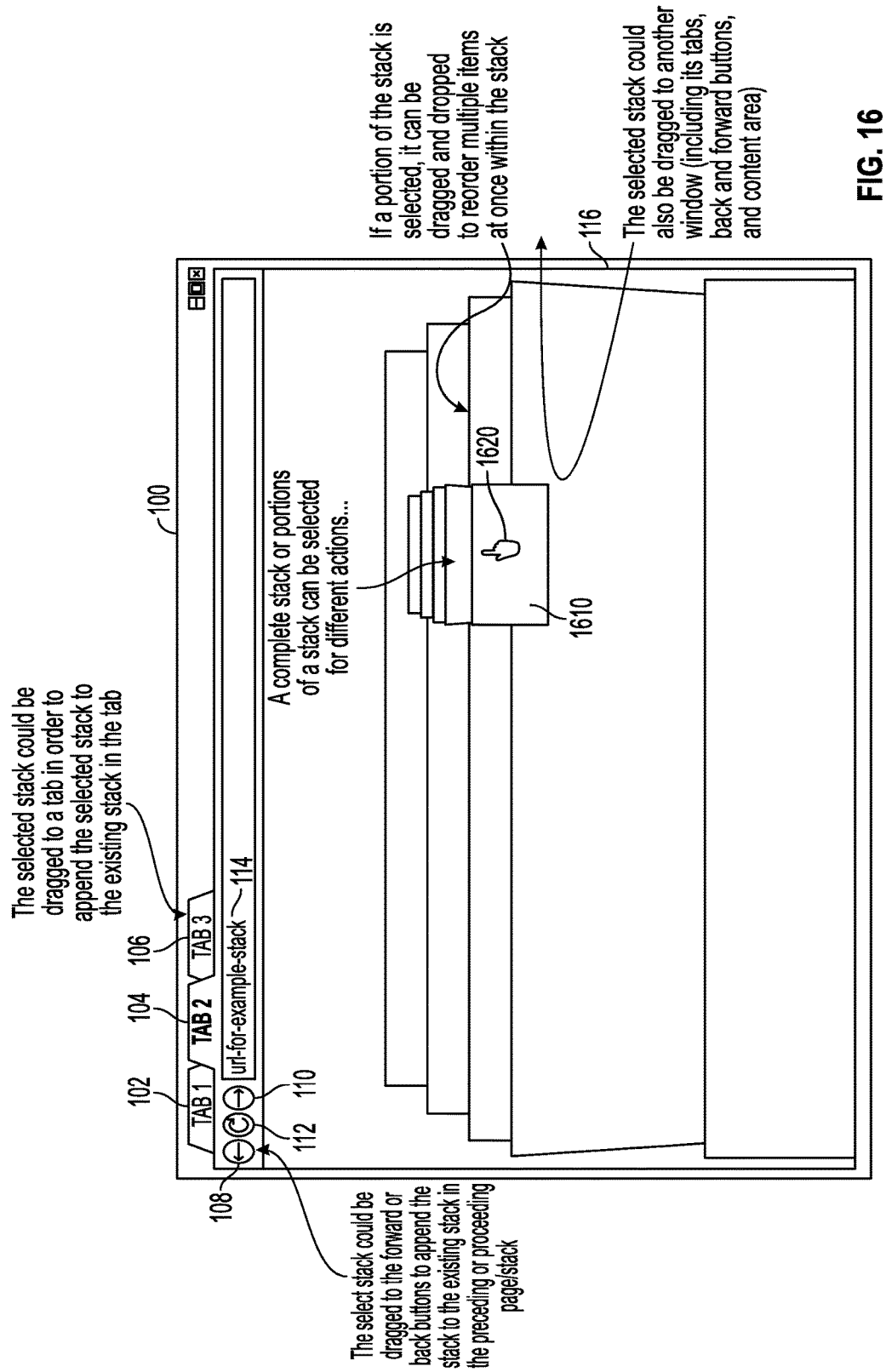
FIG. 16 illustrates an example stack of pages being selected.

FIG. 16 illustrates an example 1610 stack of pages being selected in the application window 100. The stack 1610 may represent two or more pages from the stack displayed in the active tab 104 or the stack 1610 may be imported into the active tab 104 from another tab, another window, a bookmark or a message in a messaging application. As shown, the stack 1610 is selected using a cursor 1620. Upon selection, the user may use the cursor 1620 to indicate an action to be taken with the stack 1610. For example, the stack 1610 may be dragged to the back button 108 to append the stack 1610 to an existing stack prior to the stack currently displayed in active tab 104 in the first dimension. The stack 1610 may be dragged to the forward button 110 to append the stack 1610 to an existing stack following to the stack currently displayed in active tab 104 in the first dimension. The stack 1610 may be dragged to an inactive tab 102 or 106 to append the stack 1610 to the existing stack in that inactive tab 102 or 106 either at the beginning or at the end of the stack, depending on settings specified by the application associated with the application window 100. The stack 1610 may be dragged into the middle of the stack presented in the tab 104 to insert the stack 1610 into the middle of the stack presented in the tab 104. Using this technique, multiple cards of the stack may be reordered simultaneously. The stack 1610 may be dragged into another window. If the stack 1610 is dragged into an existing window, the stack is added to any existing stack in that window (no alterations to existing buttons or tabs might be done). If the stack 1610 is dragged to the other predetermined area (e.g., open area to the right) where there is no existing window, then tabs and buttons may be created in the existing window to the extent that this is already done by the application (e.g., browser) and the operating system with the exception of any new buttons specific to multidimensional navigation (e.g., button(s) relating to navigating in the second dimension). As would be realized by a skilled person, any user action described herein for a single page/card in a stack may be completed on a set of multiple pages/cards in the stack or on an entire stack.

Figure 17:
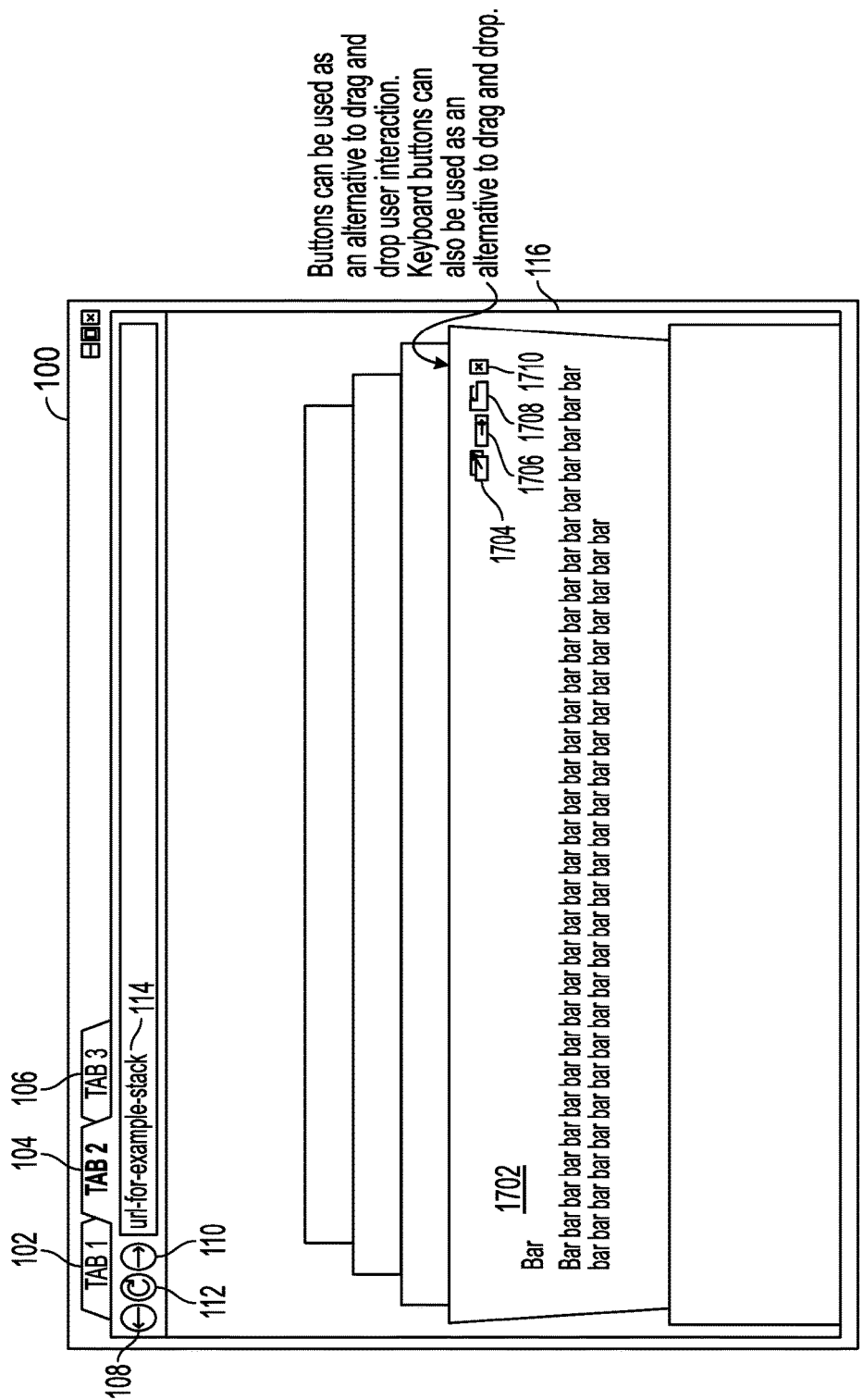
FIG. 17 illustrates example buttons for interfacing with a page in a stack.

FIG. 17 illustrates example buttons for interfacing with a page in a stack in the application window 100. As shown, a card 1702 representing a page in the stack is selected. The card 1702 includes buttons 1704, 1706, 1708, and 1710 for interfacing with the card, as an alternative or in addition to the drag-and-drop techniques described above. For example, button 1704, when selected, may allow the user to share the page associated with the card 1702 via a messaging service. Button 1706, when selected, may cause the page associated with the card 1702 to open in a new window. Button 1708, when selected, may cause the page associated with the card 1702 to open in a new tab. Button 1710, when selected, may cause the card 1702 to be removed from the stack.

Several different buttons and drag-and-drop commands for interfacing with the stack are described herein. However, different buttons or drag-and-drop commands from those described herein may also be used to interface with the stack. In addition, other user interface techniques, different from buttons or drag-and-drop, may be used to interface with the stack. In some cases, on a computing device with a keyboard, keyboard shortcuts may be used in addition to or in place of one or more of the buttons 1704, 1706, 1708, and 1710.

Figure 18A:
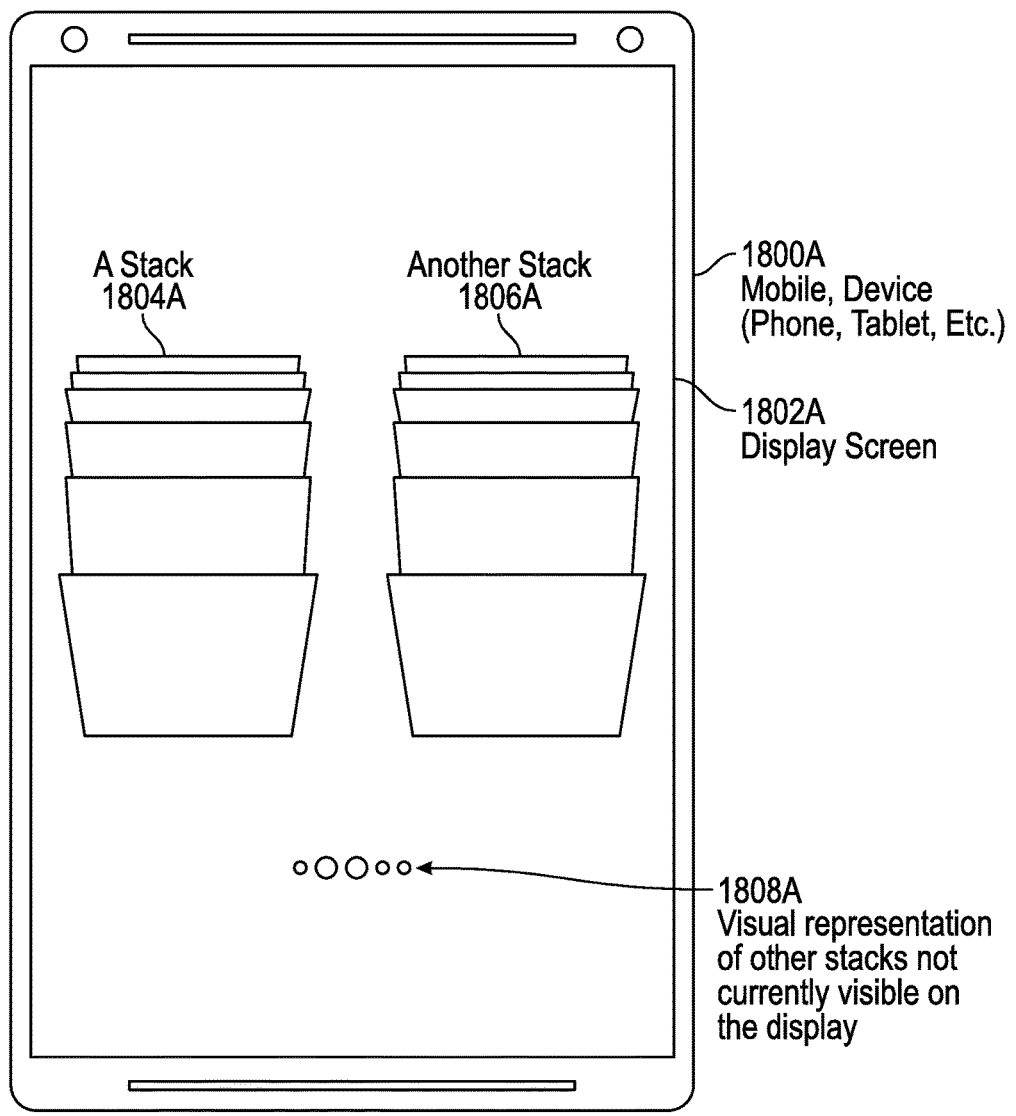
FIG. 18A illustrates a first example interface for accessing stacks of pages on a mobile device.

FIG. 18A illustrates a first example interface for accessing stacks of pages on a mobile device 1800A. As shown, the mobile device 1800A has a display screen 1802A. The display screen 1802A displays two stacks 1804A and 1806A and indicators 1808A that additional stacks exist. The displayed stacks 1804A and 1806A may be arranged according to an order, for example, the order in which they were created according to a first linear progression (e.g., corresponding to back/forward button navigation). The indicators 1808A may also be arranged according to the order, with indications (e.g., enlargement, highlighting, etc.) of the indicators corresponding to the stacks 1804A and 1806A that are currently on the display screen 1802A.

Figure 18B:
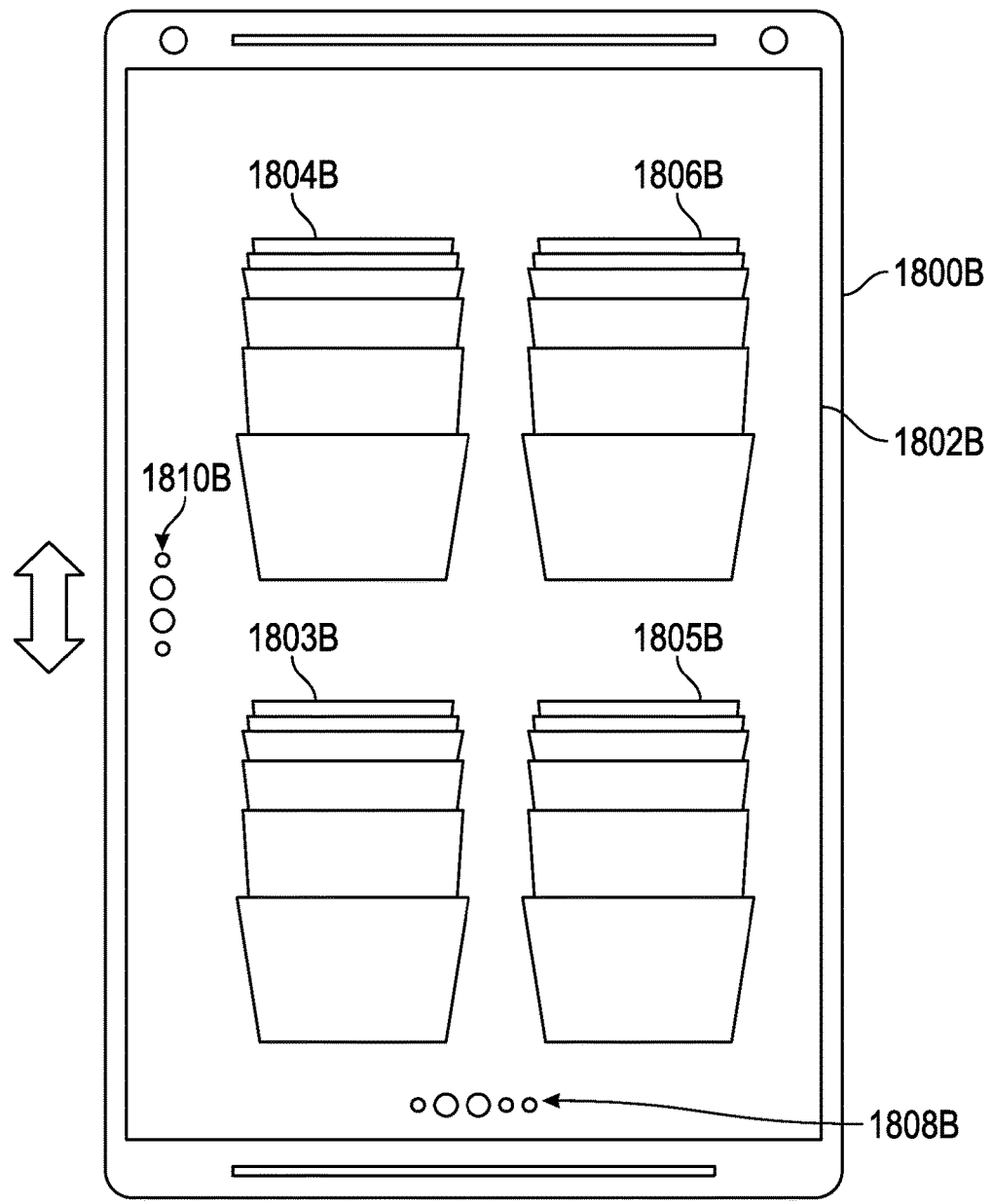
FIG. 18B illustrates a second example interface for accessing stacks of pages on a mobile device.

FIG. 18B illustrates a second example interface for accessing stacks of pages on a mobile device 1800B. As shown, the mobile device 180B has a display screen 1802B. The display screen 1802B displays four stacks 1803B, 1804B, 1805B, and 1806B and indicators 1808B and 1810B that additional stacks exist. Each row of stacks 1804B-

1806B and 1803B-1805B may correspond to a tab in an application. The displayed stacks in each tab may be arranged according to an order, for example, the order in which they were created according to a first linear progression (e.g., corresponding to back/forward button navigation). The indicator 1808B indicates that additional stacks exist in at least one of the linear progressions of stacks 1804B-1806B or 1803B-1805B. The indicator 1810B indicates that additional tabs exist. Each of the indicators 1808B and 1810B may also be arranged according to the order, with indications (e.g., enlargement, highlighting, etc.) of the indicators corresponding to the stacks 1803B, 1804B, 1805B, and 1806B that are currently on the display screen 1802A.

In the above examples, a first dimension of navigation, which may use the back button 108 and the forward button 110 of FIG. 1, may be implemented by storing a list of addresses previously visited pages in the application. The addresses may include URI addresses. A second dimension of navigation, which may use a stack, may be implemented by combining the URI addresses into a single master URI address. The URI addresses may be written into the master URI address in the same order in which they are placed in the stack. A combination character or set of characters, for example &&& may be placed in between the URI addresses of the pages in the stack. For example, a user may place the pages example.com/mercury.html, example.com/venus.html, and example.com/mars.html in the stack. The master URI of the stack may then be: example.com/mercury.html&&&example.com/venus.html&&&example.com/mars.html, where the three URIs of the pages are in the same order as they appear in the stack, and the combination characters &&& are placed in between the URIs of the pages. In some cases, the master URI may be compressed from the combination of URIs described above. For example, gzip or similar compression techniques may be used.

Figure 19:
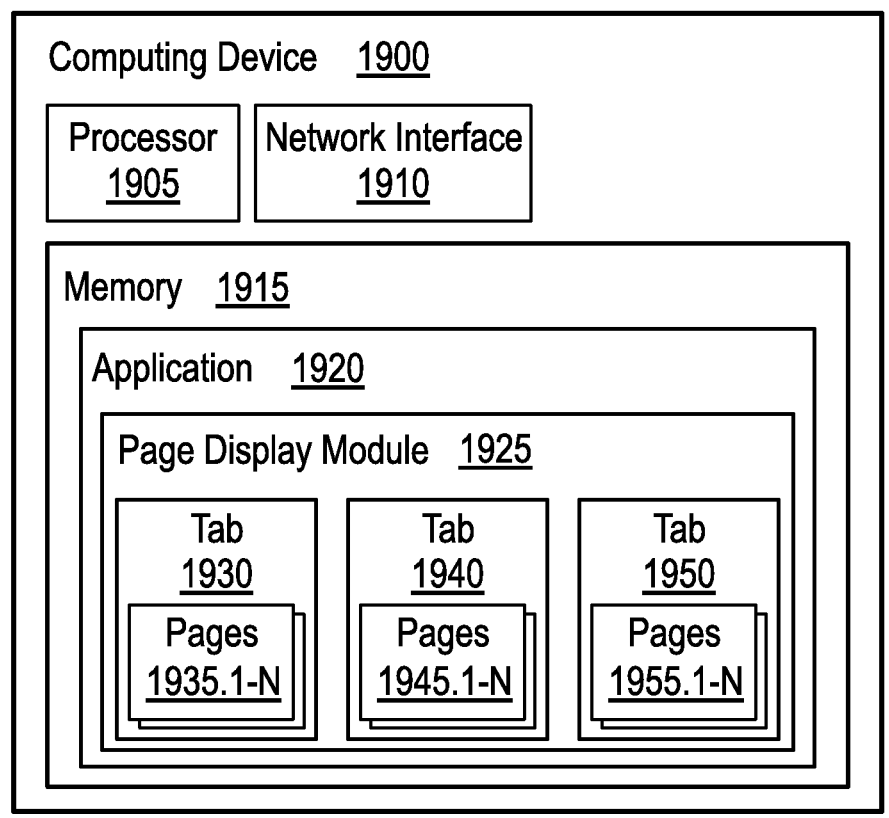
FIG. 19 illustrates an example computing device which may implement multidimensional navigation.

FIG. 19 illustrates an example computing device 1900 which may implement multidimensional navigation. As shown, the computing device 1900 includes a processor 1905, a network interface 1910, and a memory 1915. While a single processor 1905 is illustrated, the computing device 1900 may have multiple processors arranged in one or more processing units, such as a central processing unit (CPU), a graphics processing unit (GPU) or any other processing unit. The processor 1905 executes computer instructions that are stored in a computer-readable medium, for example, the memory 1915. The network interface 1910 allows the computing device 1900 to transmit and receive data in a network, for example, the Internet, a WiFi network, a cellular network, a local area network, a wide area network, etc. The memory 1915 stores data and/or instructions. The memory 1915 may be one or more of a cache unit, a storage unit, an internal memory unit, or an external memory unit. As illustrated, the memory 1915 includes an application 1920.

The application 1920 may be any application that displays pages. For example, the application 1920 may be a web browser application, a document processing application, a book reading application, a gaming application, a social networking application, etc. The application 1920 may correspond to the application that displays the application window 100 of FIG. 1. As shown, the application 1920 includes a page display module 1925 that controls how pages are displayed by the application 1920. The page display module may include instructions for implementing, via the processor 1905, the process described below in conjunction with FIG. 20. The page display module 1925 includes tabs 1930, 1940, and 1950. The tab 1930 stores multiple pages 1935.1-N, which may be navigated according to a linear progression or a multidimensional progression using the back/forward buttons and/or stacks. Similarly, the tab 1940 stores pages 1945.1-N and the tab 1950 stores pages 1955.1-N. While the application 1920, is shown as having multiple tabs 1930, 1940, and 1950, the subject technology may also be implemented in an application that does not use tabs.

As described above, the subject technology may be implemented locally on the computing device 1900, within the application 1920, in the memory 1915 of the computing device 1900. The code for implementing the subject technology may reside, fully or partially, on the computing device 1900. Alternatively, the code for implementing the subject technology may reside, fully or partially, on a server or servers remote from the computing device 1900. According to one example, a user may decide, when selecting a link, whether a linked page should be navigated to using the first dimension or the second dimension. For example, the linked page could be navigated to using the second dimension by default or using the first dimension if the user right clicks the link and selects an appropriate option in the presented dropdown menu. The code for implementing the user's decision may reside at the computing device 1900. According to another example, the author of the page providing the link may provide, within the link, instructions regarding whether the link should be navigated to using the first dimension or the second dimension. For example, links may be navigated to using the first dimension by default, or using the second dimension if the author of the page providing the link adds a special instruction within the code of the page. The code for implementing the author's instruction may reside in a web server or web servers remote from the computing device 1900. Alternatively, the code for implementing the author's instructions can reside locally at the computing device 1900 in the form of a client-side script (e.g., JavaScript) or a client-side application. In some cases, the code may reside in the cloud. As would be realized by a skilled person, any software described herein may reside on the computing device 1900, on a server or in the cloud.

Figure 20:
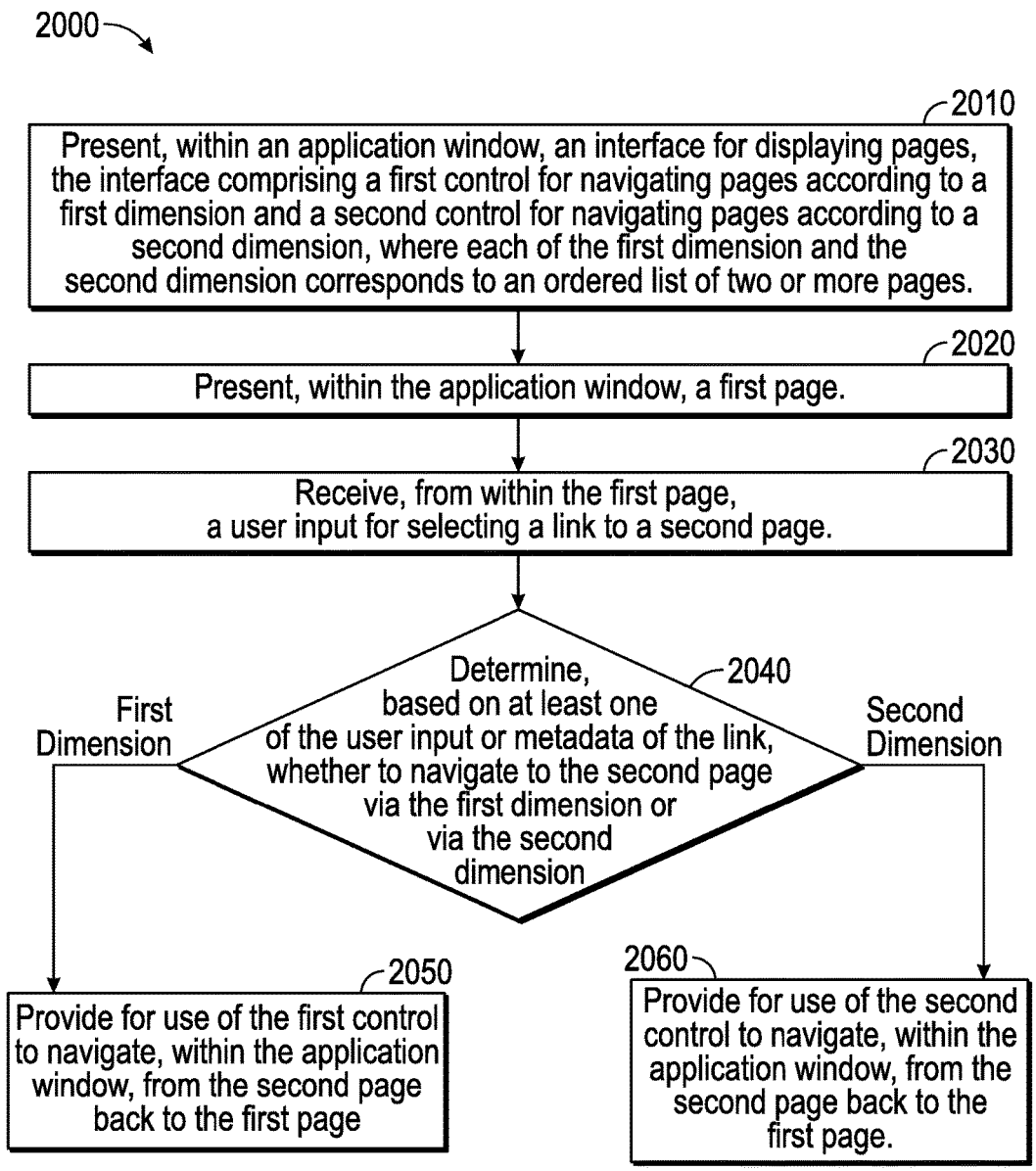
FIG. 20 illustrates an example process by which multidimensional navigation may be completed.

FIG. 20 illustrates an example process 2000 by which multidimensional navigation may be completed. The process 2000 begins at step 2010, where an application (e.g., application 1920) presents, within a first application window, an interface for displaying pages. The interface includes a first control for navigating pages according to a first dimension and a second control for navigating pages according to a second dimension. Each of the first dimension and the second dimension correspond to an ordered list of two or more pages. According to some examples, the first control includes a back button and a forward button, and the second control includes a control, presented within the window, for accessing a stacking interface.

In step 2020, the application presents, within the application window, a first page. For example, the first page may be presented responsive to the user opening the application to a home page or responsive to the user typing an address into the address bar. The first page may be downloaded over a network (e.g., using the network interface 1910) or may be a locally-stored page from the local memory (e.g., memory 1915).

In step 2030, the application receives, from within the first page, a user input for selecting a link to a second page. The user input may include the user clicking the link with a mouse. Alternatively, the user input may include the user touching the link on a touchscreen.

In step 2040, the application determines, based on at least one of the user input or metadata of the link, whether to navigate to the second page via the first dimension or via the second dimension. The metadata of the link may be provided by an author of the first page and may indicate that the link uses either the first or the second dimension for navigation to the linked page. The user input may include a left click for navigation via the second dimension or a right click and a selection of an option from a dropdown menu for navigation via the first dimension. Upon determining to navigate via the first dimension, the process 2000 continues to step 2050. Upon determining to navigate via the second dimension, the process 2000 continues to step 2060.

In step 2050, the application navigates to the second page and provides for use of the first control to navigate, within the application window, from the second page back to the first page. For example, if the first control includes a back button and forward button, the application may provide for use of the back button to navigate from the second page back to the first page. After step 2050, the process 2000 ends.

In step 2060, the application navigates to the second page and provides for use of the second control to navigate, within the application window, from the second page back to the first page. For example, if the second control is for a stacking interface, the application may provide for use of the stacking interface to navigate from the second page back to the first page. After step 2060, the process 2000 ends.

According to some examples, the second control may include a portion of the first page that continues to be presented while the second page is presented, where, upon selection of the first page, the first page is re-presented within the window. According to some examples, the second control includes a button, two parallel lines, or another user interface element indicating that the stack exists. Upon receiving a selection of the second control, the application presents a stack including two or more cards representing two or more pages that are accessible, via the second dimension, from a page previously displayed in the window. The two or more pages may include the first page and the second page. A card representing a page may include a portion of the page or an address of the page.

The application may store information related to the first page or information related to the second page (or information related to any other page in the stack). The information related to the first page may include an amount of time the user spent viewing the first page and/or a time when the first page was last updated. The information related to the second page may include an amount of time the user spent viewing the second page and/or a time when the second page was last updated. The information related to the first page or the information related to the second page may be presented to the user. The information about other pages in the stack (if any) may be similar to the information about the first page or the second page and may also be presented to the user.

The process 2000 is described above as being implemented in an application window without tabs. However, the process 2000 may be implemented in a tab of an application window, for example, in the tab 104 of the application window 100. The application window may include a single tab or multiple tabs.

Figure 21:
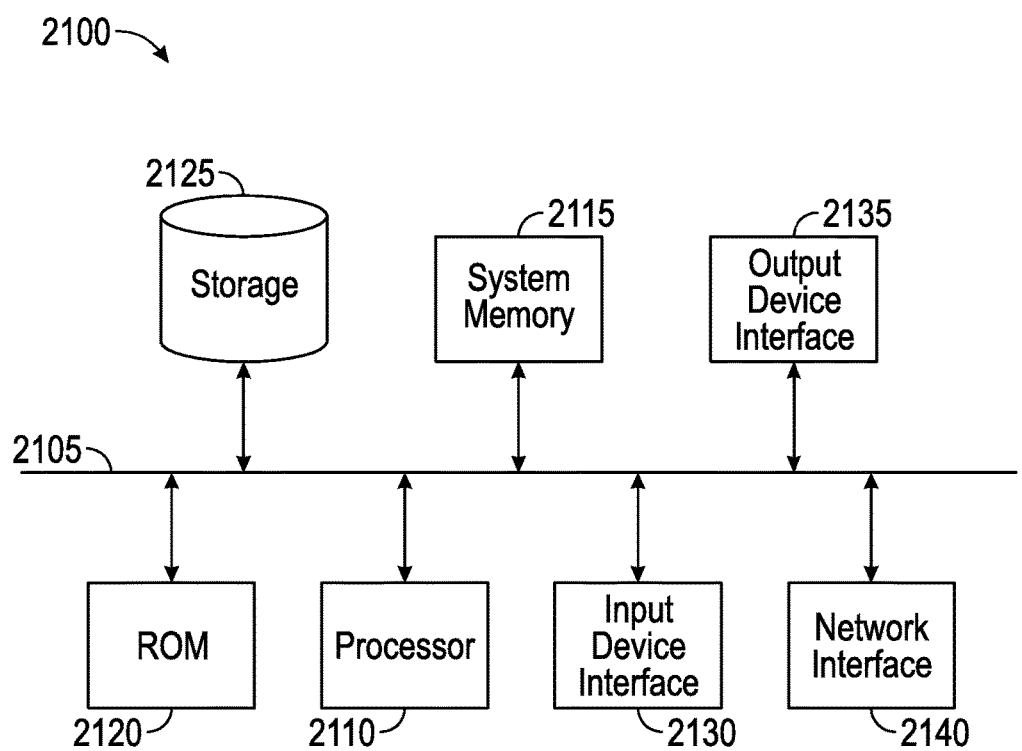
FIG. 21 conceptually illustrates an example electronic system with which some implementations of the subject technology are implemented.

FIG. 21 conceptually illustrates an electronic system 2100 with which some implementations of the subject technology are implemented. For example, the computing device 1900 may be implemented using the arrangement of the electronic system 2100. The electronic system 2100 can be a computer (e.g., a mobile phone, PDA), or any other sort of electronic device. Such an electronic system includes various types of computer readable media and interfaces for various other types of computer readable media. Electronic system 2100 includes a bus 2105, processor(s) 2110, a system memory 2115, a read-only memory 2120, a permanent storage device 2125, an input device interface 2130, an output device interface 2135, and a network interface 2140.

The bus 2105 collectively represents all system, peripheral, and chipset buses that communicatively connect the numerous internal devices of the electronic system 2100. For instance, the bus 2105 communicatively connects the processor(s) 2110 with the read-only memory 2120, the system memory 2115, and the permanent storage device 2125.

From these various memory units, the processor(s) 2110 retrieves instructions to execute and data to process in order to execute the processes of the subject technology. The (processor(s) can include a single processor or a multi-core processor in different implementations.

The read-only-memory (ROM) 2120 stores static data and instructions that are needed by the processor(s) 2110 and other modules of the electronic system. The permanent storage device 2125, on the other hand, is a read-and-write memory device. This device is a non-volatile memory unit that stores instructions and data even when the electronic system 2100 is off. Some implementations of the subject technology use a mass-storage device (for example a magnetic or optical disk and its corresponding disk drive) as the permanent storage device 2125.

Other implementations use a removable storage device (for example a floppy disk, flash drive, and its corresponding disk drive) as the permanent storage device 2125. Like the permanent storage device 2125, the system memory 2115 is a read-and-write memory device. However, unlike storage device 2125, the system memory 2115 is a volatile read-and-write memory, such a random access memory. The system memory 2115 stores some of the instructions and data that the processor needs at runtime. In some implementations, the processes of the subject technology are stored in the system memory 2115, the permanent storage device 2125, or the read-only memory 2120. For example, the various memory units include instructions for multidimensional navigation in accordance with some implementations. From these various memory units, the processor(s) 2110 retrieves instructions to execute and data to process in order to execute the processes of some implementations.

The bus 2105 also connects to the input and output device interfaces 2130 and 2135. The input device interface 2130 enables the user to communicate information and select commands to the electronic system. Input devices used with input device interface 2130 include, for example, alphanumeric keyboards and pointing devices (also called "cursor control devices"). Output device interfaces 2135 enables, for example, the display of images generated by the electronic system 2100. Output devices used with output device interface 2135 include, for example, printers and display devices, for example cathode ray tubes (CRT) or liquid crystal displays (LCD). Some implementations include devices for example a touch screen that functions as both input and output devices.

Finally, as shown in FIG. 21, bus 2105 also couples electronic system 2100 to a network (not shown) through a network interface 2140. In this manner, the electronic system 2100 can be a part of a network of computers (for example a local area network (LAN), a wide area network (WAN), or an Intranet, or a network of networks, for example the Internet. Any or all components of electronic system 2100 can be used in conjunction with the subject technology.

The above-described features and applications can be implemented as software processes that are specified as a set of instructions recorded on a computer readable storage medium (also referred to as computer readable medium). When these instructions are executed by one or more processor(s) (which may include, for example, one or more processors, cores of processors, or other processing units), they cause the processor(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processor and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN)

and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A non-transitory computer-readable medium comprising instruction which, when executed by one or more computers, cause the one or more computers to implement a method, the method comprising:
    presenting, within an application window, an interface for displaying resources addressable via uniform resource indicator (URI) addresses, the interface comprising a first control for navigating the resources according to a first dimension and a second control for navigating the resources according to a second dimension different from the first dimension;
    presenting, within the application window, a first resource;
    receiving, from within the first resource, a user input for selecting a link within the first resource to a second resource;
    determining a navigation dimension for navigating from the first resource to the second resource based on a rule applied to the link, wherein the rule selects the navigation dimension as the second dimension when the first resource and the second resource belong to a same host, wherein the same host uses at least one of a protocol, a hostname, or a port number, and wherein the rule selects the navigation dimension as the first dimension otherwise;
    selecting the navigation dimension according to metadata of the link when the metadata is predefined by the first resource and indicates whether the navigation dimension is the first dimension or the second dimension;
    selecting the navigation dimension as the first dimension when the user input comprises a selection of an option to treat the link as a non-multidimensional link;
    navigating to the second resource via the selected navigation dimension; and
    providing for use, based on the selected navigation dimension, of either the first control or the second control to navigate, within the application window, from the second resource back to the first resource.

2. The computer-readable medium of claim 1, wherein the first control comprises a back button and a forward button, wherein the first resource comprises a first page, and wherein the second resource comprises a second page.

3. The computer-readable medium of claim 1, wherein the second control comprises a portion of the first resource that continues to be presented while the second resource is presented, the method further comprising:
    upon selection of the portion of the first resource, re-presenting the first resource within the window.

4. The computer-readable medium of claim 1, wherein the second control comprises a control, presented within the window, for accessing a stacking interface, the method further comprising:
    receiving a selection of the second control; and
    presenting, responsive to the selection of the second control, a stack, the stack including two or more cards representing two or more resources that are accessible, via the second dimension, from a resource previously displayed in the window, wherein the two or more resources include the first resource and the second resource.

5. The computer-readable medium of claim 4, wherein a card representing a resource comprises a portion of the represented resource or an address of the represented resource.

6. The computer-readable medium of claim 4, the method further comprising:
    receiving an input corresponding to dragging a card across the window; and
    reordering the resources in the stack responsive to the input corresponding to dragging the card across the window.

7. The computer-readable medium of claim 4, the method further comprising:
    receiving an input corresponding to dragging a card to a predetermined position; and
    deleting a resource in the stack responsive to the input corresponding to dragging the card to the predetermined position.

8. The computer-readable medium of claim 4, the method further comprising:
receiving an input corresponding to dragging a card to a predetermined position; and
moving a resource in the stack to a new window or a new tab responsive to the input corresponding to dragging the card to the predetermined position.

9. The computer-readable medium of claim 1, wherein a stack of resources accessible via the second dimension is represented as a master uniform resource indicator (URI) address that includes a combination of uniform resource indicator (URI) addresses of resources in the stack, wherein the stack of resources includes the first resource and the second resource.

10. The computer-readable medium of claim 9, the method further comprising:
receiving a user input for sharing the master URI address via a messaging service; and sharing the master URI address via the messaging service in response to the user input for sharing the master URI address via the messaging service.

11. The computer-readable medium of claim 1, the method further comprising:
storing, in association with the first resource, information related to the first resource, the information comprising an amount of time a user spent viewing the first resource and a time when the first resource was last updated;
storing, in association with the second resource, information related to the second resource, the information comprising an amount of time a user spent viewing the second resource and a time when the second resource was last updated; and
presenting, to the user, the information related to the first resource or the information related to the second resource.

12. The computer-readable medium of claim 1, wherein navigation from the first resource to the second resource is via the first dimension, the method further comprising:
receiving, from within the second resource, an additional user input for selecting an additional link to a third resource;
determining, based on at least one of the additional user input or metadata of the additional link, to navigate to the third resource via the second dimension; and
responsive to determining to navigate to the third resource via the second dimension, navigating to the third resource and providing for use of the second control to navigate, within the application window, from the third resource back to the second resource.

13. The computer-readable medium of claim 12, the method further comprising:
responsive to determining to navigate to the third resource via the second dimension, continuing to provide for use of the first control to navigate, within the application window, from the third resource back to the first resource.

14. The computer-readable medium of claim 1, wherein the application window comprises a web browser, and wherein the resources comprise webpages.

15. A method comprising:
presenting, within an application window, an interface for displaying resources addressable via uniform resource indicator (URI) addresses, the interface comprising a first control for navigating the resources according to a first dimension and a second control for navigating the resources according to a second dimension different from the first dimension;
presenting, within the application window, a first resource;
receiving, from within the first resource, a user input for selecting a link within the first resource to a second resource;
determining a navigation dimension for navigating from the first resource to the second resource a rule applied to the link, wherein the rule selects the navigation dimension as the second dimension when the first resource and the second resource belong to a same host, wherein the same host uses at least one of a protocol, a hostname, or a port number, and wherein the rule selects the navigation dimension as the first dimension otherwise;
selecting the navigation dimension according to metadata of the link when the metadata is predefined by the first resource and indicates whether the navigation dimension is the first dimension or the second dimension;
selecting the navigation dimension as the first dimension when the user input comprises a selection of an option to treat the link as a non-multidimensional link;
navigating to the second resource via the selected navigation dimension; and
providing for use, based on the selected navigation dimension, of either the first control or the second control to navigate, within the application window, from the second resource back to the first resource.

16. The method of claim 15, wherein the first control comprises a back button and a forward button, wherein the first resource comprises a first page, and wherein the second resource comprises a second page.

17. The method of claim 15, wherein the second control comprises a portion of the first resource that continues to be presented while the second resource is presented, the method further comprising:
upon selection of the portion of the first resource, re-presenting the first resource within the window.

18. The method of claim 15, wherein the second control comprises a control, presented within the application window, for accessing a stacking interface, the method further comprising:
receiving a selection of the second control; and
presenting, responsive to the selection of the second control, a stack, the stack including two or more cards representing two or more resources that are accessible, via the second dimension, from a resource previously displayed in the application window, wherein the two or more resources include the first resource and the second resource.

19. A system comprising:
one or more processors; and
a memory comprising instructions which, when executed by the one or more processors, cause the one or more processors to:
present, within an application window, an interface for displaying resources addressable via uniform resource indicator (URI) addresses, the interface comprising a first control for navigating the resources according to a first dimension and a second control for navigating the resources according to a second dimension different from the first dimension, wherein at least one of the first control and the second control comprises a control for accessing a stacking interface;

present, within the application window, a first resource;
receive, from within the first resource, a user input for selecting a link within the first resource to a second resource;
determining a navigation dimension for navigating from the first resource to the second resource based on a rule applied to the link, wherein the rule selects the navigation dimension as the second dimension when the first resource and the second resource belong to a same host, wherein the same host uses at least one of a protocol, a hostname, or a port number, and wherein the rule selects the navigation dimension as the first dimension otherwise;
selecting the navigation dimension according to metadata of the link when the metadata is predefined by the first resource and indicates whether the navigation dimension is the first dimension or the second dimension;
selecting the navigation dimension as the first dimension when the user input comprises a selection of an option to treat the link as a non-multidimensional link;
navigating to the second resource via the selected navigation dimension; and providing for use, based on the selected navigation dimension, of either the first control or the second control to navigate, within the application window, from the second resource back to the first resource.

\* \* \* \* \*